US011645007B2

(12) United States Patent
Yoon et al.

(10) Patent No.: US 11,645,007 B2
(45) Date of Patent: May 9, 2023

(54) MEMORY DEVICE INCLUDING PLURALITY OF BUFFER AREAS FOR SUPPORTING FAST WRITE AND FAST READ AND STORAGE DEVICE INCLUDING THE SAME

(71) Applicant: SAMSUNG ELECTRONICS CO., LTD., Suwon-si (KR)

(72) Inventors: Songho Yoon, Yongin-si (KR); Dong-Min Kim, Hwaseong-si (KR); Youngmoon Kim, Suwon-si (KR); Jeong-Woo Park, Hwaseong-si (KR); Kyoung Back Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/903,700

(22) Filed: Jun. 17, 2020

(65) Prior Publication Data

US 2021/0034298 A1 Feb. 4, 2021

(30) Foreign Application Priority Data

Aug. 2, 2019 (KR) .......................... 10-2019-0094435

(51) Int. Cl.
*G06F 3/06* (2006.01)

(52) U.S. Cl.
CPC .......... *G06F 3/0659* (2013.01); *G06F 3/0611* (2013.01); *G06F 3/0656* (2013.01); *G06F 3/0679* (2013.01); *G06F 2212/7203* (2013.01)

(58) Field of Classification Search
CPC .... G06F 3/0659; G06F 3/0611; G06F 3/0656; G06F 3/0679; G06F 2212/7203
See application file for complete search history.

(56) References Cited

U.S. PATENT DOCUMENTS

| 5,619,676 A | 4/1997 | Fukuda et al. |
| 5,920,888 A | 7/1999 | Shirotori et al. |
| 6,112,265 A * | 8/2000 | Harriman ................ G06F 3/061 |
| | | 710/39 |
| 7,178,092 B2 | 2/2007 | Akamatsu |

(Continued)

FOREIGN PATENT DOCUMENTS

EP 3771983 3/2021

OTHER PUBLICATIONS

Kwon, Se Jin, and Tae-Sun Chung. "Data pattern aware FTL for SLC+ MLC hybrid SSD." Design Automation for Embedded Systems 19.1 (2015): 101-127. (Year: 2015).*

*Primary Examiner* — Kalpit Parikh
(74) *Attorney, Agent, or Firm* — F. Chau & Associates, LLC

(57) ABSTRACT

A storage device includes a nonvolatile memory device that includes a first region including memory cells configured to store n-bit data and a second region including memory cells configured to store m-bit data and a memory controller, where n and m are natural numbers and n is less than m. The first region includes a first area and a second area, and the second region includes a third area. The memory controller is configured to perform one of a turbo write operation on the first area or the second area and a normal write operation on the third area, and configured to perform one of a turbo read operation on the first area or the second area and a normal read operation on the third area.

20 Claims, 23 Drawing Sheets

(56) References Cited

U.S. PATENT DOCUMENTS

| | | |
|---|---|---|
| 7,505,535 B2 | 3/2009 | Ha et al. |
| 8,131,931 B1* | 3/2012 | Roberts ................ G06F 12/121 |
| | | 711/118 |
| 8,259,498 B2 | 9/2012 | Yogev et al. |
| 8,417,928 B2 | 4/2013 | Zhao et al. |
| 9,116,837 B2 | 8/2015 | Post et al. |
| 10,042,754 B2 | 8/2018 | Moon et al. |
| 2008/0126680 A1* | 5/2008 | Lee ........................ G06F 3/064 |
| | | 711/103 |
| 2010/0153631 A1 | 6/2010 | Moon et al. |
| 2013/0173844 A1 | 7/2013 | Chen et al. |
| 2013/0275652 A1* | 10/2013 | Simionescu .......... G06F 3/0607 |
| | | 711/103 |
| 2014/0372678 A1* | 12/2014 | Moon ................ G06F 12/0246 |
| | | 711/103 |
| 2015/0309927 A1 | 10/2015 | Sinclair et al. |
| 2017/0092366 A1 | 3/2017 | Hwang et al. |
| 2017/0249255 A1* | 8/2017 | Edwards ............... G06F 3/0649 |
| 2019/0034330 A1 | 1/2019 | Natarajan et al. |
| 2019/0095116 A1* | 3/2019 | Igahara ................ G06F 3/0619 |
| 2020/0150873 A1* | 5/2020 | Saxena ................ G06F 3/0679 |

\* cited by examiner

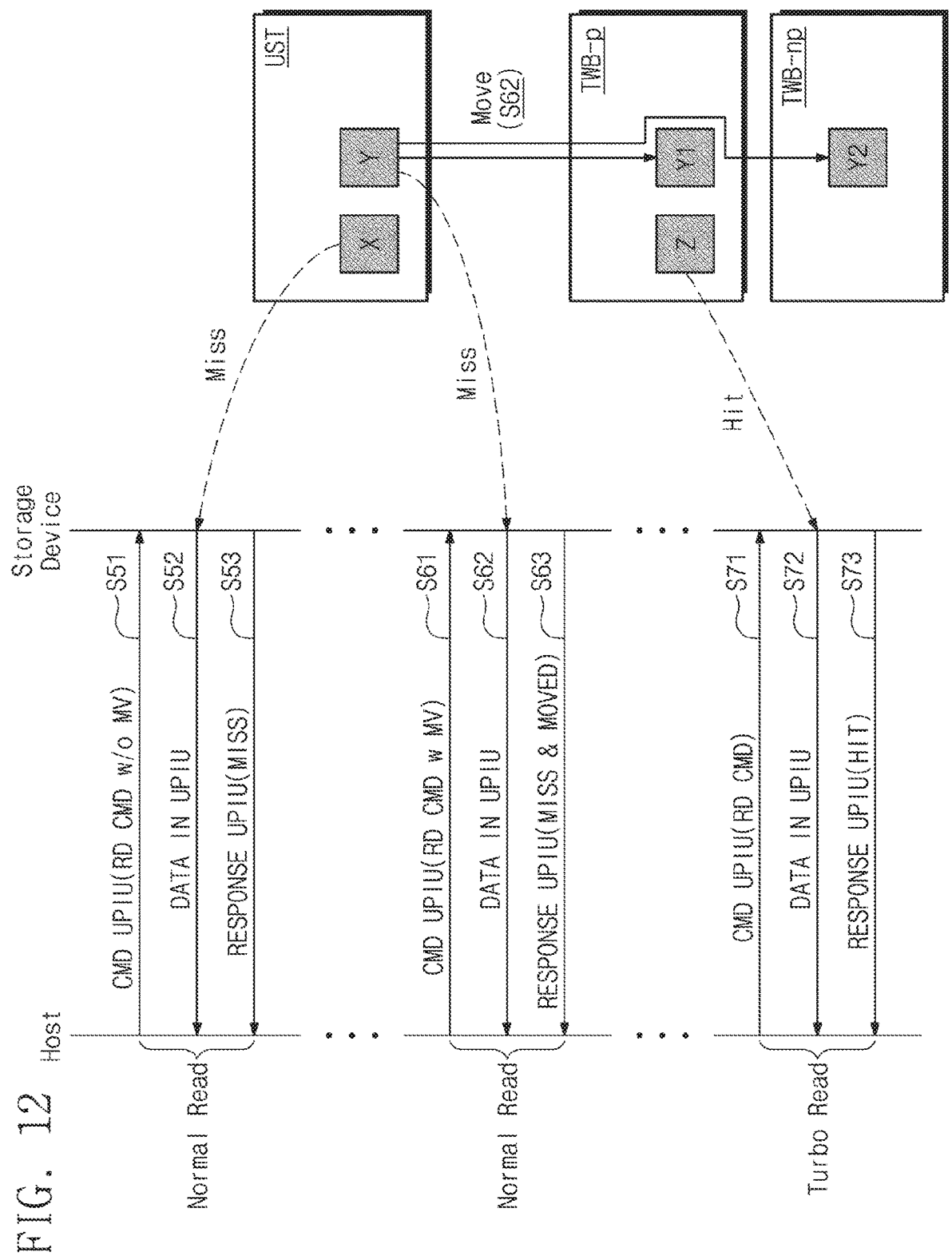

MEMORY DEVICE INCLUDING PLURALITY OF BUFFER AREAS FOR SUPPORTING FAST WRITE AND FAST READ AND STORAGE DEVICE INCLUDING THE SAME

CROSS-REFERENCE TO RELATED APPLICATIONS

This U.S. non-provisional patent application claims priority under 35 U.S.C. § 119 to Korean Patent Application No. 10-2019-0094435 filed on Aug. 2, 2019, in the Korean Intellectual Property Office, the disclosure of which is incorporated by reference in its entirety herein.

BACKGROUND

1. Technical Field

Embodiments of the inventive concept disclosed herein relate to a storage device, and more particularly, relate to a storage device capable of performing write and read operations more quickly by using a plurality of buffer areas.

2. Discussion of Related Art

Semiconductor memories may be classified into volatile memory devices and nonvolatile memories. Volatile memories lose data stored therein at power-off, and include a static random access memory (SRAM), a dynamic RAM (DRAM), and a synchronous DRAM (SDRAM). Nonvolatile memory devices retain data stored therein even at power-off, and include a read only memory (ROM), a programmable ROM (PROM), an electrically programmable ROM (EPROM), an electrically erasable and programmable ROM (EEPROM), a flash memory device, a phase-change RAM (PRAM), a magnetic RAM (MRAM), a resistive RAM (RRAM), and a ferroelectric RAM (FRAM).

A flash memory device is widely used in computing devices to store large quantities of data. A universal flash storage (UFS) interface defined by the JEDEC standard may support a higher operating speed than a conventional flash memory based storage device.

SUMMARY

At least one embodiment of the inventive concept provides a memory device that supports faster writes and reads and a method of operating the storage device to perform these faster writes and reads.

According to an exemplary embodiment of the inventive concept, a storage device includes a nonvolatile memory device that includes a first area, a second area, and a third area, and a memory controller that controls a turbo write operation for recording first data at the first area or the second area or a turbo read operation for reading second data from the first area or the second area.

According to an exemplary embodiment of the inventive concept, a storage device includes a nonvolatile memory device and a memory controller. The nonvolatile memory device includes a first region including memory cells configured to store n-bit data and a second region including memory cells configured to store m-bit data, where the first region includes a first area and a second area, and the second region includes a third area, n and m are natural numbers and n is less than m. The memory controller is configured to perform one of a turbo write operation on the first area or the second area and a normal write operation on the third area, and configured to perform one of a turbo read operation on the first area or the second area and a normal read operation on the third area.

According to an exemplary embodiment of the inventive concept, a storage device includes a nonvolatile memory device that includes a first area, a second area, and a third area, and a memory controller that includes a memory area property manager to manage an area, in which write data received from a host is to be stored, from among the first to third areas, and a memory area manager to control a move of data between the first to third areas and the memory area property manager that preferentially records the first data at the first area or the second area rather than the third area in response to a write command from the host.

According to an exemplary embodiment of the inventive concept, a storage device includes a nonvolatile memory device and a memory controller. The nonvolatile memory device includes a first region used as a single-level cell (SLC) space and a second region used as a multi-level cell (MLC) space or a triple-level cell (TLC) space. The memory controller is configured to write data received from a host to one of the first region and the second region, in response to a write command from the host. The memory controller preferentially writes the data to the first region upon receiving a request from the host to enable a turbo write operation.

According to an exemplary embodiment of the inventive concept, a storage device includes a nonvolatile memory device including a turbo write buffer and user storage, wherein the write buffer includes a plurality of memory cells each storing a first bit, and the user storage buffer includes a plurality of memory cells each storing a second bit greater than the first bit, and a memory controller that writes data to a pinned turbo write buffer or a non-pinned turbo write buffer of the turbo write buffer in response to a write command universal flash storage protocol information unit (UPIU) received from a host.

BRIEF DESCRIPTION OF THE FIGURES

The inventive concept will become apparent by describing in detail exemplary embodiments thereof with reference to the accompanying drawings.

FIG. 12 is a flowchart illustrating operations of a storage system of FIG. 1 according to an exemplary embodiment of the inventive concept.

DETAILED DESCRIPTION OF THE EXEMPLARY EMBODIMENTS

Below, exemplary embodiments of the inventive concept are described in detail and clearly to such an extent that one of ordinary skill in the art can implement the inventive concept.

Components that are described in the detailed description with reference to the terms "unit", "module", or "block" and function blocks illustrated in drawings may be implemented with software, hardware, or a combination thereof. In an embodiment, the software may be a machine code, firmware, an embedded code, and application software. For example, the hardware may include an integrated circuit (IC), an application specific IC (ASIC), a field programmable gate array (FPGA), a complex programmable logic device (CPLD), a microelectromechanical system (MEMS), a processor, a passive element, or a combination thereof.

Figure 1:
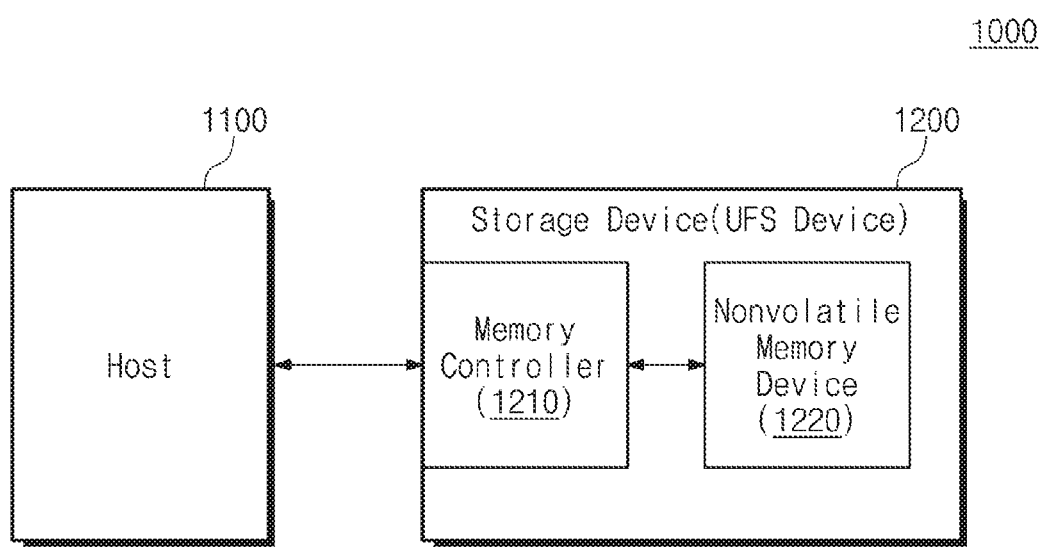
FIG. 1 illustrates a storage system according to an exemplary embodiment of the inventive concept.

FIG. 1 is a block diagram illustrating a storage system according to an exemplary embodiment of the inventive concept. Referring to FIG. 1, a storage system 1000 may include a host 1100 and a storage device 1200. In an exemplary embodiment of the inventive concept, the storage system 1000 may include one of various computing systems such as a personal computer, a notebook, a tablet, a smartphone, and a wearable device.

The host 1100 may store data in the storage device 1200 or may read data stored in the storage device 1200. For example, the host 1100 may transfer a write command and write data to the storage device 1200 to store data in the storage device 1200. Alternatively, to read data from the storage device 1200, the host 1100 may transfer a read command to the storage device 1200 and may receive data from the storage device 1200.

The host 1100 may include a main processor such as a central processing unit (CPU) or an application processor (AP). In addition, the host 1100 may include an auxiliary processor, which assists the main processor, such as a graphics processing unit (GPU) or a neural processing unit (NPU).

The storage device 1200 may operate under control of the host 1100. For example, the storage device 1200 may include a controller 1210 and a nonvolatile memory device 1220. The controller 1210, also referred to as a memory controller, may operate in response to a command received from the host 1100. For example, the controller 1210 may receive a write command and write data from the host 1100 and may store the received write data in the nonvolatile memory device 1220 in response to the received write command.

Alternatively, the controller 1210 may receive a read command from the host 1100 and may read data stored in the nonvolatile memory device 1220 in response to the received read command. Afterwards, the controller 1210 may transfer the read data to the host 1100. In an exemplary embodiment of the inventive concept, the nonvolatile memory device 1220 may be a NAND flash memory device, but the inventive concept is not limited thereto.

In an exemplary embodiment of the inventive concept, the host 1100 may communicate with the storage device 1200 based on a universal flash storage (UFS) interface or protocol defined by the JEDEC standard. For example, the host 1100 and the storage device 1200 may exchange packets in the form of a UFS protocol information unit (UPIU). The UPIU may include various information defined by an interface (e.g., a UFS interface) between the host 1100 and the storage device 1200. However, the inventive concept is not limited thereto. Below, for convenience of description, the terms "command", "UPIU", and "data" may be interchangeable, and the terms may have the same meaning or different meanings depending on the embodiments disclosed herein.

In an exemplary embodiment of the inventive concept, the storage device 1200 may support a turbo write function or a turbo write feature. The turbo write function may be enabled or disabled under control of the host 1100. When the turbo write function is enabled under control of the host 1100, the storage device 1200 may perform a turbo write operation. The turbo write operation may be performed based on a single level cell (SLC) buffering scheme but, not limited thereto, and may provide improved performance (in particular, improved write performance) of the storage device 1200. The turbo write operation will be more fully described with reference to drawings below.

Figure 2:
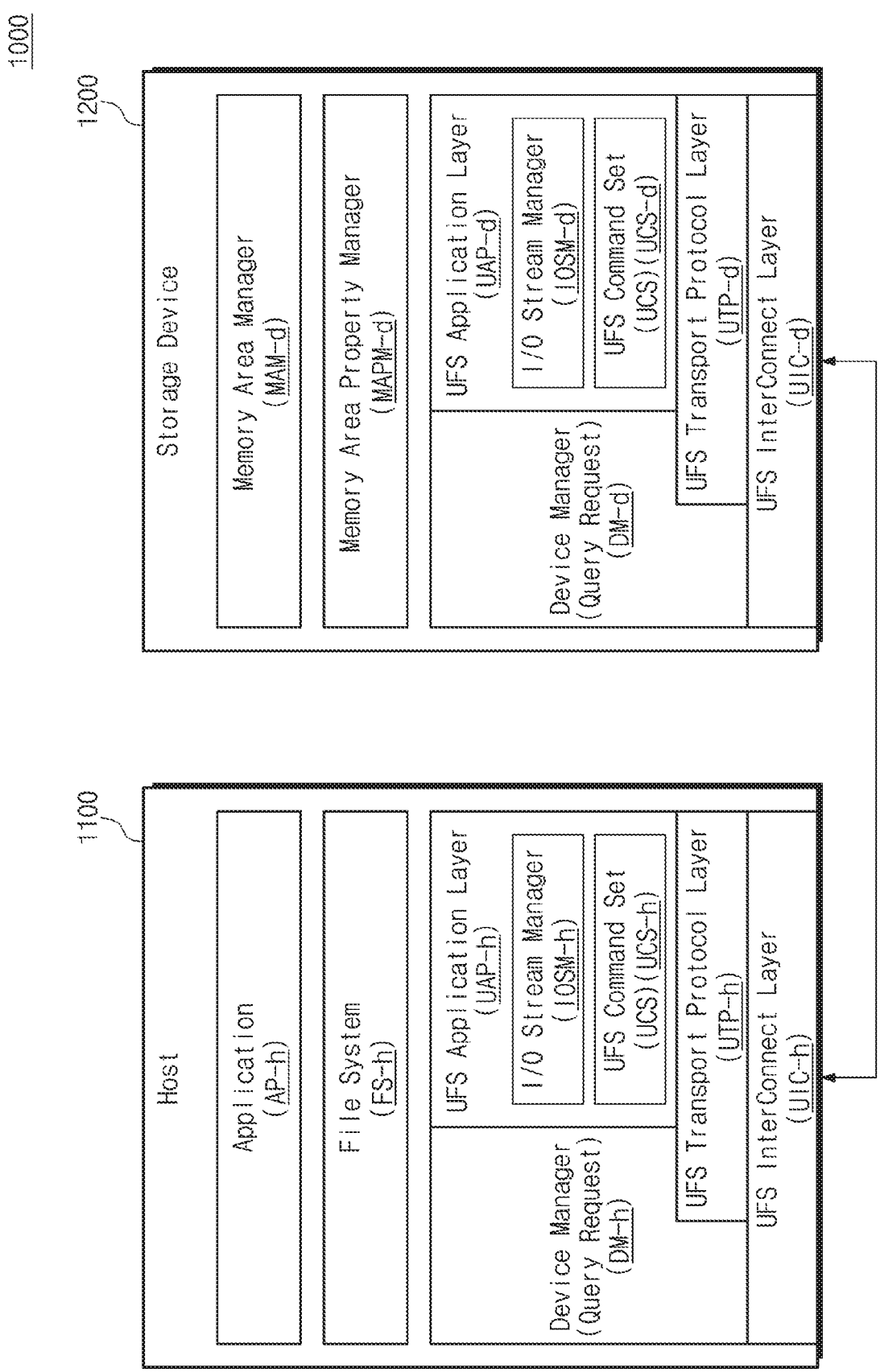
FIG. 2 illustrates a hierarchical structure complying with an exemplary interface protocol, which is applicable to a storage system of FIG. 1.

FIG. 2 is a diagram illustrating a hierarchical structure of the storage system 1000 of FIG. 1. For example, the storage system 1000 may include the host 1100 and the storage device 1200. The host 1100 may include an application AP-h, a file system FS-h, a device manager DM-h, a UFS application layer UAP-h, a UFS transport protocol layer UTP-h, and a UFS interconnect layer UIC-h.

The application AP-h may include various application programs, processes, etc. that are driven at the host 1100. The application AP-h that is an upper layer may handle a request from a user of the storage system 1000. The application AP-h may handle normal commands for a read operation and a write operation. The application AP-h may provide control at a device level using a query request.

The file system FS-h may organize and manage a variety of data (files) generated by the application AP-h. The file system FS-h may generate a logical address corresponding to an access request (e.g., a write request or the like) to the storage device 1200. In an embodiment, the file system FS-h may include FAT (File Allocation Table), FAT32, NTFS (NT File System), HFS (Hierarchical File System), JSF2 (Journaled File System2), XFS, ODS-5 (On-Disk Structure-5), UDF, ZFS, UFS (Unix File System), ext2, ext3, ext4, ReiserFS, Reiser4, ISO 9660, Gnome VFS, BFS, WinFS, etc.

The UFS application layer UAP-h is configured to support various commands between the host 1100 and the storage device 1200. For example, the UFS application layer UAP-h may include an input/output (I/O) stream manager IOSM-h and a UFS command set UCS-h. The I/O stream manager IOSM-h is configured to manage a request from the application AP-h or the file system FS-h.

In an exemplary embodiment of the inventive concept, the I/O stream manager IOSM-h may be configured to identify a particular value of an input/output from the application AP-h or the file system FS-h. The I/O stream manager IOSM-h may be configured to manage a priority of a request from the application AP-h or the file system FS-h or to support various functions according to the request from the application AP-h or the file system FS-h. In an exemplary embodiment of the inventive concept, the I/O stream manager IOSM-h may be configured to support the turbo write function or the turbo read function.

In an exemplary embodiment of the inventive concept, a particular application or process specified by the host 1100 or a user of the host 1100 may use the turbo write or the turbo read. The I/O stream manager IOSM-h may determine whether to perform the turbo write or the turbo read in response to a write or read request that is made by the particular application or process with regard to the storage device 1200.

In addition, particular data that are managed by the file system FS-h may use the turbo write or the turbo read. The I/O stream manager IOSM-h may determine whether to perform the turbo write or the turbo read in response to the write or read request for the storage device 1200 with regard to particular data (e.g., meta data).

In addition, the I/O stream manager IOSM-h may direct a move of data written in the storage device 1200. The I/O stream manager IOSM-h may adjust a read speed of data written in the storage device 1200 by moving data to the pinned turbo write buffer TWB-p, the non-pinned turbo write buffer TWB-np, or the user storage UST.

The UFS command set UCS-h may support various command sets that are supported between the host 1100 and the storage device 1200. In an exemplary embodiment of the inventive concept, the UFS command set UCS-h may include a UFS native command set and a UFS SCSI command set. The UFS command set UCS-h may configure a command to be transferred to the storage device 1200 depending on a request from the application AP-h or the file system FS-h.

Although not illustrated in drawings, the UFS application layer UAP-h may further include a task manager that processes commands for a control of a command queue.

The device manager DM-h may manage operations of a device level and configurations of a device level. In an exemplary embodiment of the inventive concept, the device manager DM-h may manage a query request for setting or checking various information of the storage device 1200.

The UFS transport protocol layer UTP-h may provide services for an upper layer. The UFS transport protocol layer UTP-h may generate a command or information provided from the UFS application layer UAP-h, or a query request provided from the device manager DM-h in the form of a UPIU (UFS Protocol Information Unit) packet.

In an exemplary embodiment of the inventive concept, the UFS transport protocol layer UTP-h and the device manager DM-h may communicate with each other through a UDM-SAP (UDM-Service Access Point). The UFS transport protocol layer UTP-h and the UFS application layer UAP-h may communicate with each other through a UTP_CMD_SAP or a UTP_TM_SAP.

The UFS interconnect layer UIC-h may manage a connection with the storage device 1200. In an exemplary embodiment of the inventive concept, the UFS interconnect layer UIC-h may include hardware configurations such as an MIPI Unipro or an MIPI M-PHY physically connected with the UFS interconnect layer UIC-d of the storage device 1200. This way the host 1100 and storage device 1200 can establish a communication channel with each other. In an exemplary embodiment of the inventive concept, the UFS interconnect layer UIC-h and the UFS transport protocol layer UTP-h may communicate through a UIC-SAP, and the UFS interconnect layer UIC-h and the device manager DM-h may communicate through a UIO-SAP.

Although not illustrated in drawings, the host 1100 may further include a device driver. The device driver may control a device and/or a layer included in the host 1100. The device driver may convert a request (e.g., a write request, a read request, etc or the like) for the storage device 1200 generated by the file system FS-h to a command capable of being identified by the storage device 1200. For example, the file system FS-h and the device driver may be included in an operating system (OS), and the application layer AP-h may be installed in the OS. The device driver may control the communication with the storage device 1200 while managing a hardware resource.

The storage device 1200 may include a memory area manager MAM-d, a memory area property manager MAPM-d, a device manager DM-d, a UFS application layer UAP-d, a UFS transport protocol layer UTP-d, and a UFS interconnect layer UIC-d. In an exemplary embodiment of the inventive concept, a configuration of the UFS application layer UAP-d, the UFS transport protocol layer UTP-d, and the UFS interconnect layer UIC-d may be similar to that of the UFS application layer UAP-h, the UFS transport protocol layer UTP-h, and the UFS interconnect layer UIC-h of the host 1100 and allows corresponding layers to logically communicate with each other, and thus, additional description will be omitted to avoid redundancy.

The memory area property manager MAPM-d of the storage device 1200 may specify and manage an area where write data received from the host 1100 are to be stored. For example, as described above, depending on the explicit request of the host 1100 or the internal policy, the write data received from the host 1100 may be written in a space of at least one of the pinned turbo write buffer TWB-p, the non-pinned turbo write buffer TWB-np, and the user storage UST. The memory area property manager MAPM-d may select a space, in which the write data received from the host 1100 are to be stored, based on the various schemes described above and may store the write data in the selected space.

As described above, depending on the explicit request of the host 1100 or the internal policy, the memory area manager MAM-d of the storage device 1200 may control data move/flush/migration between the pinned turbo write buffer TWB-p, the non-pinned turbo write buffer TWB-np, and the user storage UST. For example, as will be described later, the storage device 1200 may perform a data move between various areas in response to a CMD UPIU, in which move attribute information MA is set, from the host 1100. In an embodiment, in the case where a particular value is set in a particular field of the CMD UPIU or a command descriptor block CDB of the CMD UPIU, the storage device 1200 may omit an operation of transferring data (e.g., a DATA IN UPIU) to the host 1100.

The above hierarchical structure and function of each of the host 1100 and the storage device 1200 is merely exemplary, and the inventive concept is not limited thereto.

Figure 3:
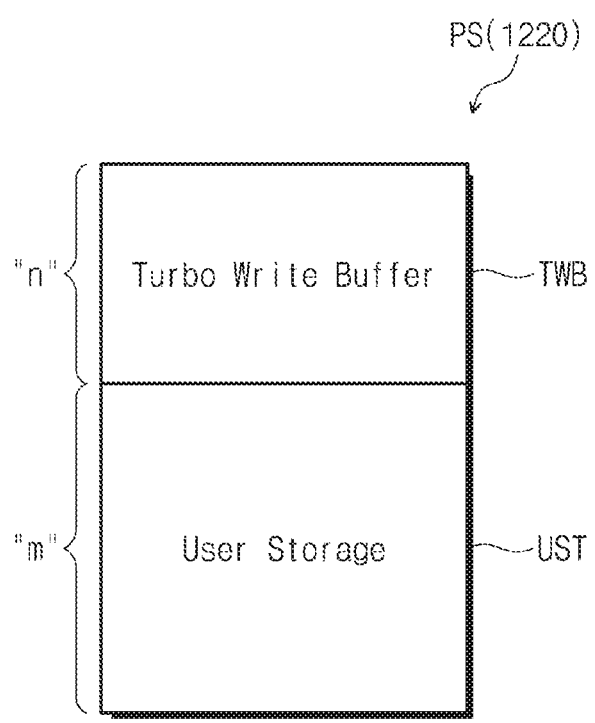
FIG. 3 illustrates a physical storage space of a storage device of FIG. 2 according to an exemplary embodiment of the inventive concept.

FIG. 3 is a diagram illustrating a physical storage space of a storage device of FIG. 2. Below, for convenience of description, the term "physical storage space PS" of the storage device 1200 of FIG. 1. The physical storage space PS of the storage device 1200 may indicate a physical area of the nonvolatile memory device 1220, in which user data are actually stored. In other words, the physical storage space PS may be a space that is identified by the host 1100 as a capacity of the storage device 1200. The host 1100 and the storage device 1200 may be implemented in compliance with the UFS protocol proposed by JEDEC for the purpose of communicating with each other, but the inventive concept is not limited thereto.

In an exemplary embodiment of the inventive concept, the storage device 1200 may further include any other storage space (e.g., a space not identified by the host 1100 as a capacity of the storage device 1200, such as a reserved area, a meta area for storing meta data, or an overprovisioning area for improving performance), as well as the physical storage space PS illustrated in FIG. 2. However, for convenience of description, additional description associated with the other storage space will be omitted (or minimized), and a description will be focused on the physical storage space PS where user data are stored.

Referring to FIGS. 1, 2, and 3, the physical storage space PS of the storage device 1200 may include a turbo write buffer area (TWB) (hereinafter referred to as a "turbo write buffer") and a user storage area (UST) (hereinafter referred to as a "user storage"). The user storage and the turbo write buffer may be referred to as a first region, a second region, a third region, etc.

The turbo write buffer TWB may correspond to a portion (e.g., "a") of the physical storage space PS of the nonvolatile memory device 1220. The user storage UST may correspond to the remaining portion (e.g., "b") of the physical storage space PS of the nonvolatile memory device 1220. Alternatively, the user storage UST may correspond to the entire (e.g., a+b) the physical storage space PS of the nonvolatile memory device 1220.

In an exemplary embodiment of the inventive concept, each memory cell corresponding to the turbo write buffer TWB may be an SLC, and each memory cell corresponding to the user storage UST may be a triple level cell (TLC). Alternatively, each of the memory cells corresponding to the turbo write buffer TWB may store n-bit data (n being a positive integer), and each of the memory cells corresponding to the user storage UST may store m-bit data (m being a positive integer greater than n). In other words, the turbo write buffer TWB may be an area supporting a higher write speed than the user storage UST.

The inventive concept is not limited to the above description regarding the turbo write buffer TWB and the user storage UST. For example, the number (e.g., k) of bits stored in each memory cell corresponding to the turbo write buffer TWB may be more than or equal to the number (e.g., i) of bits stored in each memory cell corresponding to the user storage UST (i.e., k≥i). In an exemplary embodiment of the inventive concept, in the turbo write buffer TWB and the user storage UST, the number of bits to be stored per memory cell may be determined by various factors of the storage device 1200 such as reliability and lifetime. Alternatively, the turbo write buffer TWB and the user storage UST may be divided by various factors such as reliability and lifetime of the storage device 1200, as well as the number of bits to be stored per memory cell.

In an exemplary embodiment of the inventive concept, each of the reference symbols "a" and "b" may be the number of memory blocks in the corresponding storage space. Values of "a" and "b" may be variously changed depending on sizes of the turbo write buffer TWB and the user storage UST and a scheme to implement the turbo write buffer TWB and the user storage UST (e.g., SLC, multi-level cell (MLC), TLC, and quad level cell (QLC)).

As described with reference to FIG. 1, the storage device 1200 may support a normal write function and a turbo write function. When the turbo write function is enabled by the host 1100, the storage device 1200 may perform the turbo write operation. When the turbo write function is disabled by the host 1100, the storage device 1200 may perform the normal write operation.

For example, in the case where the turbo write function is enabled, the storage device 1200 may preferentially write the write data received from the host 1100 in the turbo write buffer TWB. In this case, because write data received from the host 1100 are written in the turbo write buffer TWB (e.g., SLC program), a fast operating speed may be secured compared to the case where the normal write operation (e.g., TLC program) is performed on the user storage UST. In the case where the turbo write function is disabled, the storage device 1200 may not first write the write data in the turbo write buffer TWB. Depending on an internally assigned policy (e.g., a normal write policy), the storage device 1200 may directly write the write data in the user storage UST or may write the write data in the turbo write buffer TWB. How to write the write data may be determined based on various factors, such as the data share of the turbo write buffer TWB and a status of the physical storage space PS, depending on the normal write policy.

As another example, the normal write policy may first write the write data in the user storage UST. To explain the inventive concept more clearly, in the following detailed description, the normal write policy is a policy in which write data are preferentially written in the user storage UST. However, the inventive concept is not limited thereto.

In an exemplary embodiment of the inventive concept, data written in the turbo write buffer TWB may be flushed or migrated to the user storage UST depending on an explicit command from the host 1100 or an internally assigned policy.

Figure 4A:
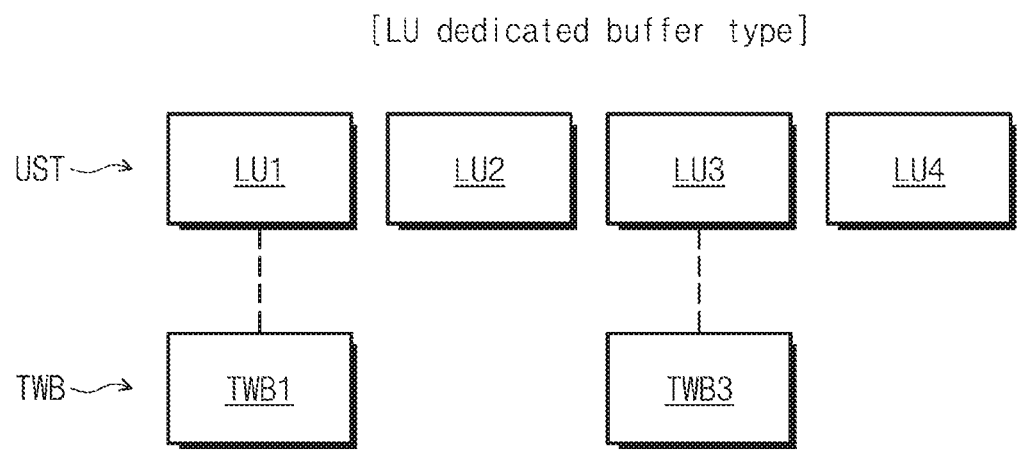
FIGS. 4A and 4B illustrate turbo write buffer types of FIG. 3.
Figure 4B:
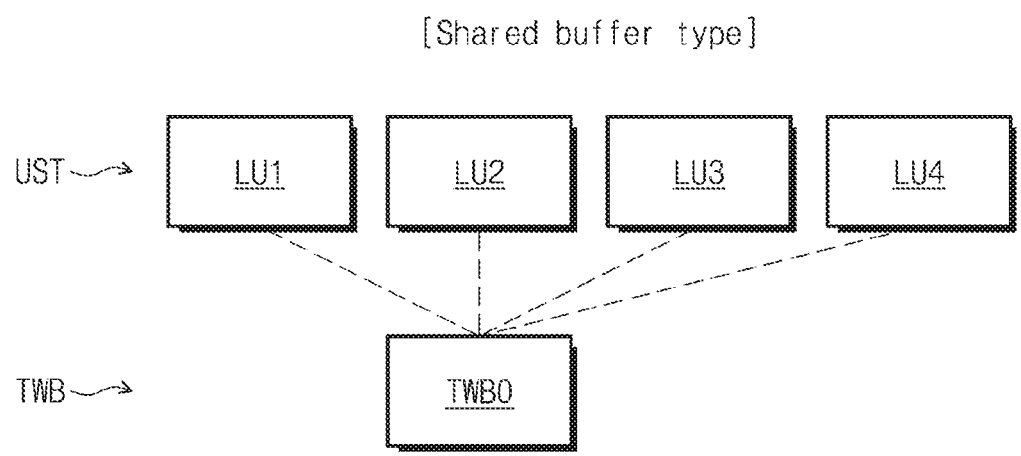

FIGS. 4A and 4B illustrate exemplary turbo write buffer types of FIG. 3. Referring to FIGS. 1 to 4B, the storage device 1200 may include first, second, third and fourth logical units LU1, LU2, LU3 and LU4. Each of the first to fourth logical units LU1 to LU4 may be an externally addressable, independent, processing entity that processes a command from the host 1100. The host 1100 may manage the storage space of the storage device 1200 through the first to fourth logical units LU1 to LU4. Each of the first to fourth logical units LU1 to LU4 may be used to store data at the storage device 1200.

Each of the first to fourth logical units LU1 to LU4 may be associated with at least one memory block of the nonvolatile memory device 1220. Various kinds of logical units that are used for various purposes may exist. However, the first to fourth logical units LU1 to LU4 may correspond to the physical storage space PS and may be used to store data of the host 1100.

The first to fourth logical units LU1 to LU4 are illustrated in FIGS. 4A and 4B, but the inventive concept is not limited thereto. For example, the storage device 1200 may further include other logical units for storing and managing user data, as well as the first to fourth logical units LU1 to LU4. Alternatively, the storage device 1200 may further include other logical units for supporting various functions, as well as the first to fourth logical units LU1 to LU4.

The turbo write buffer TWB of the storage device 1200 may be configured in various types. The turbo write buffer TWB may be configured in one of a logical unit (LU) dedicated buffer type and a shared buffer type.

In the case of the LU dedicated buffer type, the turbo write buffer TWB may be configured independently or individually for each logical unit LU. For example, as illustrated in FIG. 4A, in the LU dedicated buffer type, a first turbo write buffer TWB1 may be configured with respect to the first logical unit LU1 of the first to fourth logical units LU1 to LU4, and a third turbo write buffer TWB3 may be configured with respect to the third logical unit LU3 of the first to fourth logical units LU1 to LU4.

In the LU dedicated buffer type of FIG. 4A, in the case where the write command for the first logical unit LU1 is received after the turbo write is enabled, the write data may be preferentially written in the first turbo write buffer TWB1 corresponding to the first logical unit LU1. In the case where the write command for the third logical unit LU3 is received after the turbo write function is enabled, the write data may be preferentially written in the third turbo write buffer TWB3 corresponding to the third logical unit LU3.

In the case where there are received write commands for the second and fourth logical units LU2 and LU4 to which the turbo write buffers TWB are not assigned, the write data may be written in the user storage UST corresponding to the second and fourth logical units LU2 and LU4. In addition, in the case where the write command for the first logical unit LU1 or the third logical unit LU3 is received after the turbo write is disabled, depending on the normal write policy, the write data may be written in the user storage UST of the first logical unit LU1 or the first turbo write buffer TWB1 or may be written in the user storage UST of the third logical unit LU3 or the third turbo write buffer TWB3.

In an exemplary embodiment of the inventive concept, capacities of the first and third turbo write buffers TWB1 and TWB3 may be set independently of each other. However, the inventive concept is not limited thereto. For example, the number of logical units to which turbo write buffers are respectively assigned, a capacity of each turbo write buffer, etc., may be variously changed or modified.

In an exemplary embodiment of the inventive concept, a size of the turbo write buffer TWB for each logical unit may be set to a turbo write buffer size field per unit (e.g., "dLUNumTurboWriteBufferAllocUnits") of a unit descriptor. In an exemplary embodiment of the inventive concept, the turbo write buffer size field per unit (e.g., "dLUNumTurboWriteBufferAllocUnits") may be a configurable parameter.

In the case of the shared buffer type, one turbo write buffer may be configured with respect to all the logical units. For example, as illustrated in FIG. 4B, in the shared buffer type, there may be configured one turbo write buffer TWB0 shared by all the first to fourth logical units LU1 to LU4. In this case, when a write command for each of the first to fourth logical units LU1 to LU4 is received after the turbo write function is enabled, the write data may be first written in the shared turbo write buffer TWB0. In the case where the write command for each of the first to fourth logical units LU1 to LU4 is received after the turbo write is disabled, the write data may be written in each of the first to fourth logical units LU1 to LU4 or in the shared turbo write buffer TWB0 according to the normal write policy.

As described above, the storage device 1200 may include the turbo write buffer TWB for supporting the turbo write function. Depending on a buffer type (e.g., the LU dedicated buffer type or the shared buffer type), the turbo write buffer TWB may be configured with respect to each of a plurality of logical units or one turbo write buffer TWB may be configured to be shared by all of the logical units.

Figure 5A:
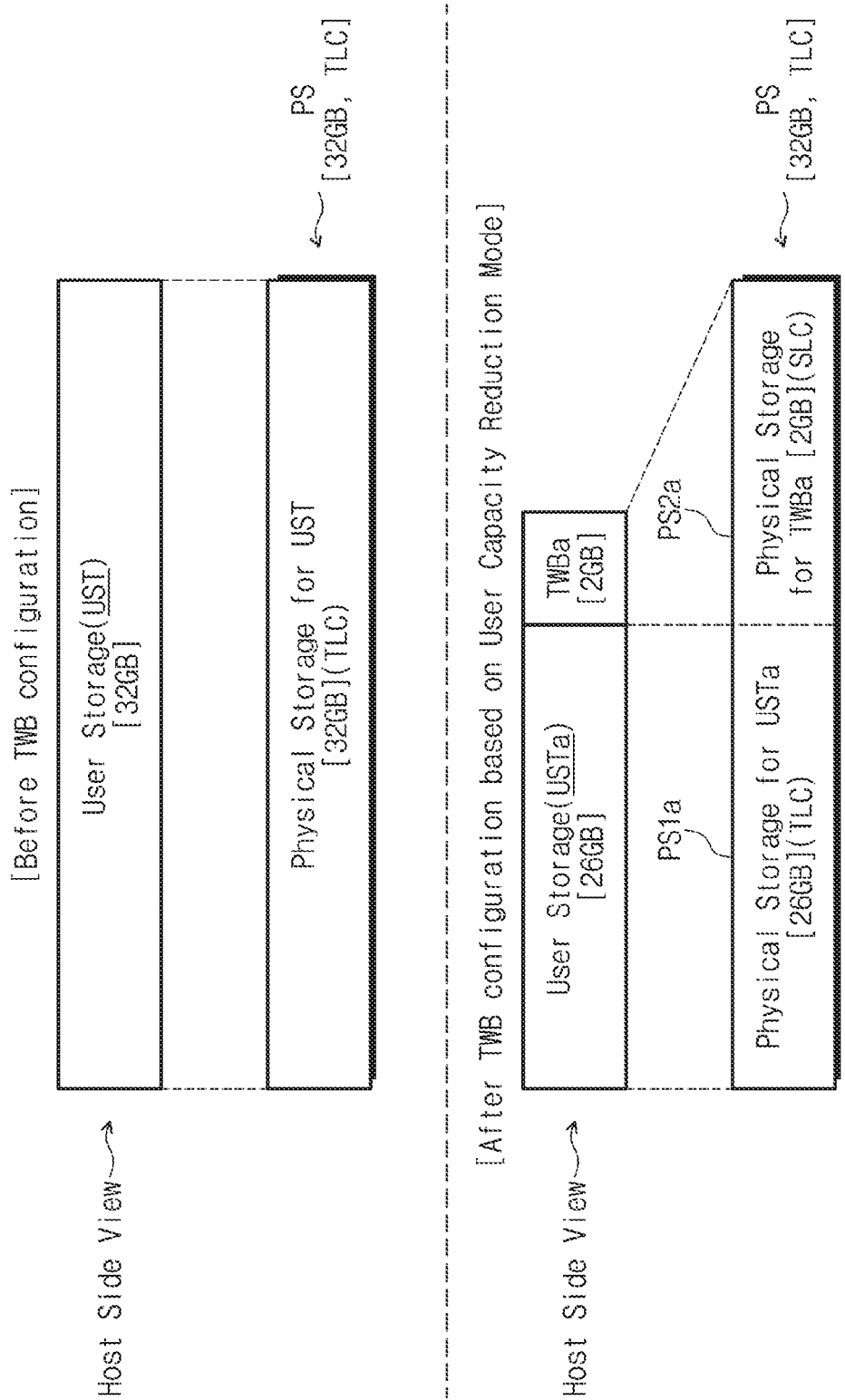
FIGS. 5A and 5B illustrate exemplary modes to configure a turbo write buffer of a storage device of FIG. 1.
Figure 5B:
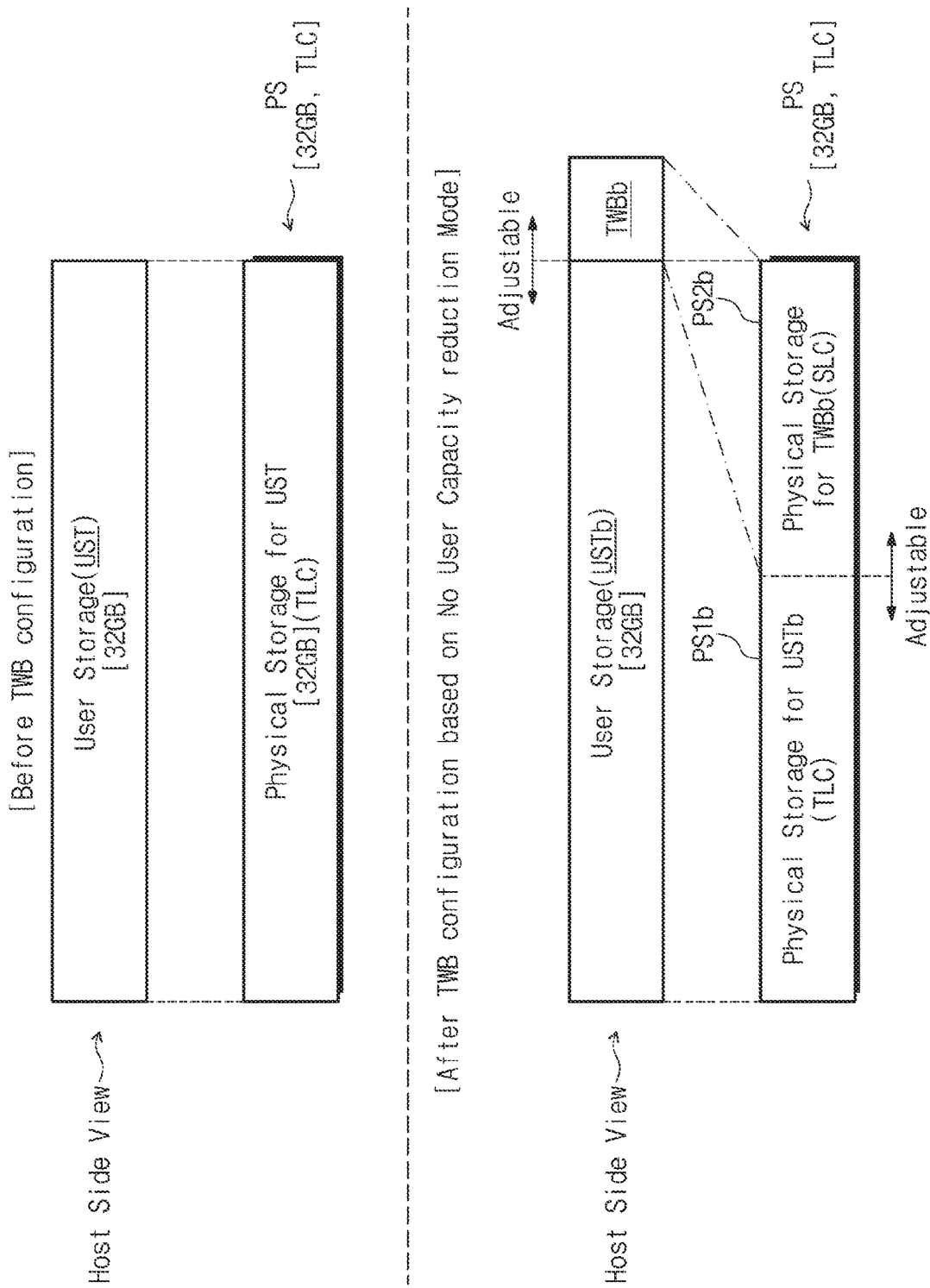

FIGS. 5A and 5B are diagrams for describing modes to configure a turbo write buffer of a storage device of FIG. 1.

Below, for convenience of description, it is assumed that the physical storage space PS of the storage device 1200 is 32 GB on the basis of the TLC. In other words, in the case where each memory cell included in the storage device 1200 stores 3-bit data, the storage device 1200 may store user data of 32 GB.

However, the inventive concept is not limited thereto. For example, the physical storage space PS of the storage device 1200 may be variously changed depending on a scheme to implement the storage device 1200 or the nonvolatile memory device 1220, for example, depending on a memory cell type (e.g., SLC, MLC, TLC, or QLC), the number of memory cells, a memory cell structure, an overprovisioning ratio, etc.

Referring to FIGS. 1, 5A, and 5B, the storage device 1200 may configure a physical storage space of the turbo write buffer TWB depending on various modes. For example, the storage device 1200 may configure a physical storage space of a turbo write buffer based on one of a user capacity reduction mode and a no user capacity reduction mode.

The user capacity reduction mode may be a mode to reduce a user capacity of user storage USTa for the purpose of configuring a turbo write buffer TWBa. For example, as illustrated in FIG. 5A, the physical storage space PS of the storage device 1200 may be 32 GB on the basis of the TLC. Before the turbo write buffer TWB is configured, the capacity of 32 GB (e.g., the entire capacity of the physical storage space PS) may be assigned to the user storage UST or may be used for the user storage UST. In this case, the user storage UST may be recognized to be 32 GB from a point of view of the host 1100.

The turbo write buffer TWB may be configured depending on the user capacity reduction mode. In this case, a second physical storage space PS2a, which is a portion of the physical storage space PS, may be assigned to a turbo write buffer TWBa or may be used for the turbo write buffer TWBa. In addition, a first physical storage space PS1a, which is a portion of the physical storage space PS, may be assigned to the user storage USTa or may be used for the user storage USTa. In this case, compared with the case where the turbo write buffer TWBa is not configured, the capacity of the user storage USTa may decrease (e.g., from 32 GB to 26 GB) from a point of view of the host 1100.

In an exemplary embodiment of the inventive concept, the first physical storage space PS1a corresponding to the user storage USTa may be implemented with the TLC, and the second physical storage space PS2a corresponding to the turbo write buffer TWBa may be implemented with the SLC. A ratio of capacities when the same storage space is used as the TLC and the SLC may be "3:1". In other words, when the size of the turbo write buffer TWBa increases as much as 1 GB, a size of a logical storage space of the user storage USTa may decrease as much as 3 GB. As described above, in the case where the turbo write buffer TWBa is configured in the user capacity reduction mode, a portion of the physical storage space PS of the storage device 1200 may be assigned for the turbo write buffer TWBa, and thus, a capacity of the user storage USTa identified by the host 1100 may be decreased.

In an exemplary embodiment of the inventive concept, the first physical storage space PS1a corresponding to the user storage USTa and the second physical storage space PS2a corresponding to the turbo write buffer TWBa may be physically adjacent to each other or may be physically spaced from each other.

The no user capacity reduction mode may be a mode in which a logical storage capacity of user storage USTb recognized by the host 1100 is not reduced even though a turbo write buffer TWBb is configured. For example, as illustrated in FIG. 5B, before the configuration of the turbo write buffer TWB, the user storage UST may have the capacity of 32 GB. In other words, the physical storage space PS of the storage device 1200 may be assigned to the user storage UST or may be used for the user storage UST.

In the case where the turbo write buffer TWB is configured based on the no user capacity reduction mode, the turbo write buffer TWBb having a particular capacity (e.g., 2 GB) may be configured. A second physical storage space PS2b, which is a portion of the physical storage space PS, may be assigned to the turbo write buffer TWBb or may be used for the turbo write buffer TWBb.

Unlike the user capacity reduction mode, the user storage USTb in the no user capacity reduction mode may maintain the capacity of 32 GB. In other words, in the no user capacity reduction mode, even though the turbo write buffer TWBb is configured, the capacity of the user storage UST identified from a point of view of the host 1100 may be identical to that before the configuration of the turbo write buffer TWBb.

In an exemplary embodiment of the inventive concept, in the no user capacity reduction mode, a size or configuration of the turbo write buffer TWBb may be varied by an internal policy of the storage device 1200 or an explicit request from the host 1100. For example, because the second physical storage space PS2b, which is a portion of the physical storage space PS, is used to configure the turbo write buffer TWBb, the first physical storage space PS1b to be used for the user storage USTb may be smaller than a capacity of the user storage USTb.

In other words, in the case where the entire first physical storage space PS1b is used to store user data or an available free capacity of the first physical storage space PS1b is equal to or smaller than a reference value, all or a portion of the second physical storage space PS2b used for the turbo write buffer TWBb may be returned to the user storage USTb.

In other words, in the physical storage space PS, in the case where the turbo write buffer TWBb cannot be maintained due to a lack of the available space for the user storage USTb, the second physical storage space PS2b assigned for the turbo write buffer TWBb may be returned to the user storage USTb. The above-described return operation may be performed, for example, through a user data flush operation and an operation of setting a turbo write buffer size.

In an exemplary embodiment of the inventive concept, the host 1100 may check a current available size of the turbo write buffer TWB of the storage device 1200. For example, the storage device 1200 may set information about a current size of the turbo write buffer TWB at a current turbo write buffer size field (e.g., "dCurrentTurboWriteBufferSzie") of attributes. In addition, the storage device 1200 may set information about a ratio of a current available capacity of the turbo write buffer TWB at an available turbo write buffer size field (e.g., "dAvailableTurboWriteBufferSize") thereof.

The host 1100 may check a current available size of the turbo write buffer TWB by checking the current turbo write buffer size field and the available turbo write buffer size field of the attributes. Based on the checked information, the host 1100 may change a policy to use the turbo write or may return a physical storage space used for the turbo write buffer TWB to the user storage UST.

As another example, the storage device 1200 may autonomously return a physical storage space used for the turbo write buffer TWB to the user storage UST. For example, the storage device 1200 could periodically compare the available space of the user storage UST against a reference value to determine whether it needs to return the physical storage space used for the turbo write buffer TWB to the user storage UST. The storage device 1200 may set a status flag to indicate the turbo write buffer TWB is no longer available when it has returned the physical storage space used for the turbo write buffer TWB to the user storage UST. The status flag may be stored in a register in the storage device 1200. The host 1100 may check a changed status of the turbo write buffer TWB through the current turbo write buffer size field. The storage device 1200 could set the current turbo write buffer size field to 0 upon returning the physical storage space used for the turbo write buffer TWB to the user storage UST.

In an exemplary embodiment of the inventive concept, the storage device 1200 may provide information about a lifetime of the turbo write buffer TWB based on the number of program/erase (P/E) cycles of a physical storage space (or a memory block) assigned or used for the turbo write buffer TWB. For example, the storage device 1200 may set information about a lifetime of the turbo write buffer TWB at a turbo write buffer lifetime estimation field (e.g., "dTurboWriteBufferLifeTimeEst") of the attributes.

The host 1100 may estimate the lifetime of the turbo write buffer TWB by checking the turbo write buffer lifetime estimation field of the attributes of the storage device 1200 through a query request. In an exemplary embodiment of the inventive concept, in the no user capacity reduction mode, because the user storage UST and the turbo write buffer TWB share the physical storage space PS, in the case where a write operation is performed on the user storage UST, the lifetime of the turbo write buffer TWB may decrease.

Figure 6:
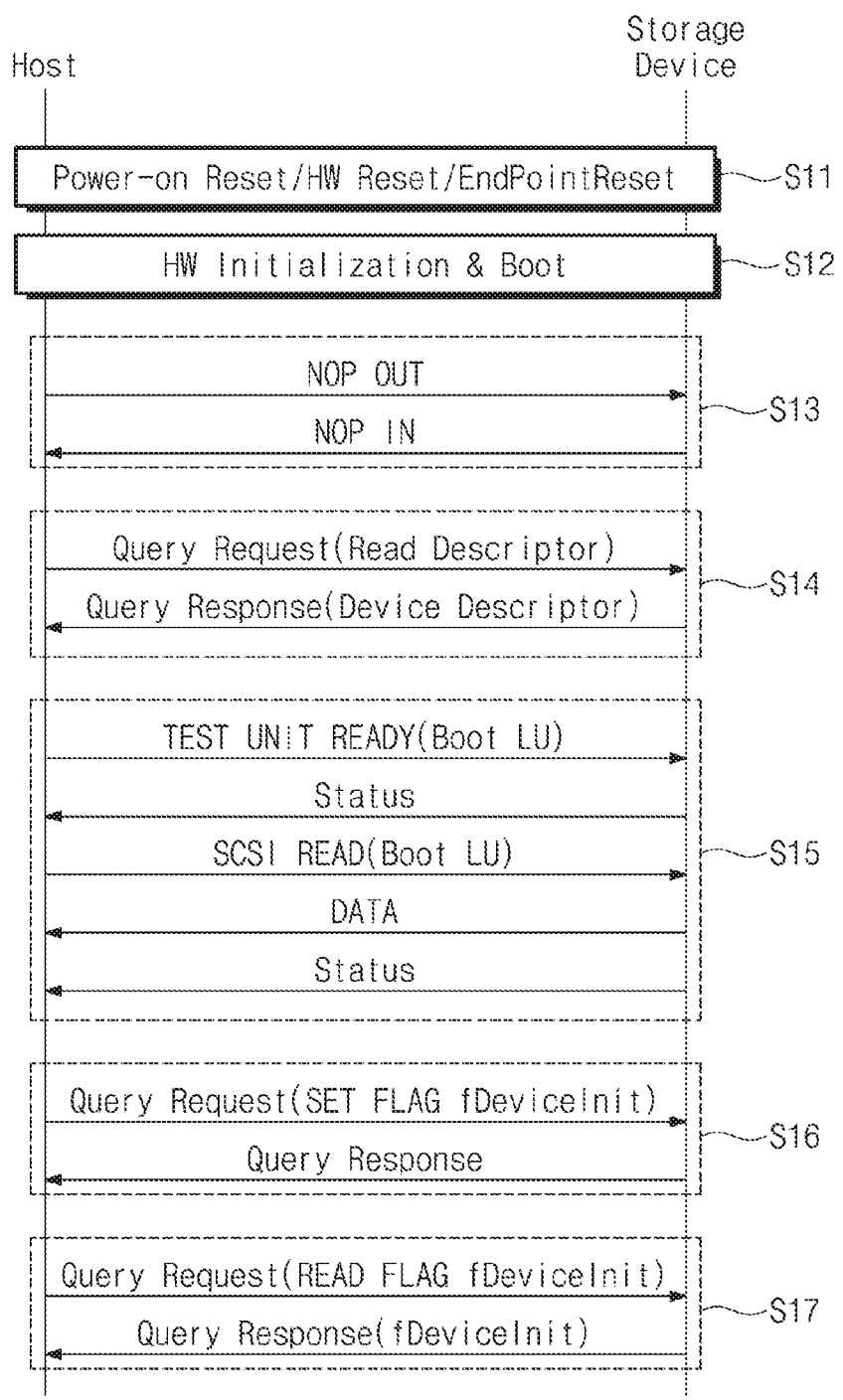
FIG. 6 is a flowchart illustrating an operation of a storage system of FIG. 1 according to an exemplary embodiment of the inventive concept.

FIG. 6 is a flowchart illustrating an operation of a storage system of FIG. 1. An initialization operation of the storage system 1000 is described with reference to FIG. 6. Referring to FIGS. 1, 3, and 6. In operation S11, the host 1100 and the storage device 1200 may perform an operation such as a power-on reset operation, a hardware reset operation, or an endpoint reset operation.

In operation S12, the host 1100 and the storage device 1200 may perform hardware reset and booting. For example, hardware layers of each of the host 1100 and the storage device 1200 may be initialized and booted.

In operation S13, the host 1100 and the storage device 1200 may perform initialization on a particular layer (e.g., an UFS transport (UTP) layer). For example, the host 1100 may transfer the NOP OUT UPIU to the storage device

1200. The storage device 1200 may transfer the NOP IN UPIU to the host 1100 in response to the NOP OUT UPIU.

In operation S14, the host 1100 may check a device descriptor from the storage device 1200. For example, the host 1100 may transfer a query request for reading a descriptor to the storage device 1200. The storage device 1200 may transfer a query response, which includes the device descriptor, to the host 1100 in response to the query request. The query request may include a read descriptor. For example, the read descriptor may indicate to the storage device 1200 that an external device desires the device descriptor.

In an exemplary embodiment of the inventive concept, the host 1100 may check a configuration and a function of the storage device 1200 through the device descriptor. For example, the device descriptor may include an extended UFS function support field (e.g., "dExtendedUFSFeatures-Support") including information about whether to support the turbo write function. In an exemplary embodiment of the inventive concept, the information about whether to support the turbo write function may be set to a particular bit (e.g., bit[8]) of the extended UFS function support field.

The device descriptor may further include a turbo write buffer no user space reduction enable field (e.g., "bTurboWriteBufferNoUserSpaceReductionEn") including information about a turbo write buffer mode. In the case where a value of the turbo write buffer no user space reduction enable field is "00h", the turbo write buffer TWB may be configured depending on the user capacity reduction mode described with reference to FIG. 4A. In the case where a value of the turbo write buffer no user space reduction enable field is "01h", the turbo write buffer TWB may be configured depending on the no user capacity reduction mode described with reference to FIG. 4B.

The device descriptor may further include a turbo write buffer type field (e.g., "bTurbowriteBufferType") including information about a turbo write buffer type. In the case where a value of the turbo write buffer type field is "00h", the turbo write buffer TWB may be configured depending on the LU dedicated buffer type described with reference to FIG. 4A. In the case where a value of the turbo write buffer type field is "01h", the turbo write buffer TWB may be configured depending on the shared buffer type described with reference to FIG. 4B.

The device descriptor may further include a shared turbo write buffer allocation number field (e.g., "dNumSharedTurboWriteBufferAllocUnits") including information about a size of a turbo write buffer. In the case where the number of units assigned to a shared turbo write buffer is set to "0", a turbo write buffer of the shared buffer type may not be configured.

The above-described fields are merely exemplary, and the inventive concept is not limited thereto. For example, the device descriptor may further include other fields including information about a configuration, a structure, a function, etc., of the storage device 1200, as well as the above-described fields. Various fields of the device descriptor may indicate values that are set before the initialization operation. The host 1100 may identify a current status of the storage device 1200 by reading various fields of the device descriptor.

In an exemplary embodiment of the inventive concept, the above-described fields of the device descriptor, such as "bTurboWriteBufferNoUserSpaceReductionEn", "bTurboWriteBufferType", and "dNumSharedTurboWriteBufferAllocUnits", may be varied by writing a value of a corresponding field of a configuration descriptor. In other words, the host 1100 may vary information such as a turbo write buffer type, turbo write buffer no user space reduction enable, and the number of units assigned to a turbo write buffer, by writing values of various fields of the configuration descriptor.

In an exemplary embodiment of the inventive concept, a geometry descriptor of the storage device 1200 may include information such as a turbo write buffer maximum size field, a turbo write buffer maximum number field, a turbo write buffer capacity adjustment factor field, a supported turbo write buffer no user capacity reduction type field, a supported turbo write buffer type field, etc. For example, the turbo write buffer maximum size field (e.g., "dTurboWriteBufferMaxNAllocUnits") may include information about a maximum size of the turbo write buffer TWB supported at the storage device 1200. The turbo write buffer maximum number field (e.g., "bDeviceMaxTurboWriteLUs") may include information about the maximum number of turbo write buffers supported at the storage device 1200.

The turbo write buffer capacity adjustment factor field (e.g., "bTurboWriteBufferCapAdjFac") may include information about a capacity reduction factor according to a kind of turbo write buffer memory. For example, in the case where the turbo write buffer TWB is implemented with the SLC and the user storage UST is implemented with the TLC, a value of the turbo write buffer capacity adjustment factor field may be "3". In the case where the turbo write buffer TWB is implemented with the SLC and the user storage UST is implemented with the MLC, a value of the turbo write buffer capacity adjustment factor field may be "2".

The supported turbo write buffer no user capacity reduction type field (e.g., "bSupportedTurboWriteBufferNoUserSpaceReductionTypes") may include information about whether the storage device 1200 supports any turbo write buffer mode (e.g., the user capacity reduction mode, the no user capacity reduction mode, or both).

The supported turbo write buffer type field (e.g., "bSupportedTurboWriteBufferTypes") may include information about whether the storage device 1200 supports any turbo write buffer type (e.g., the LU dedicated buffer type, the shared buffer type, or both).

The above-described fields are merely exemplary, and the inventive concept is not limited thereto.

In operation S15, the host 1100 may download a boot code from the storage device 1200. For example, the host 1100 may transfer the TEST UNIT READY UPIU to the storage device 1200. The storage device 1200 may transfer status information in response to the received TEST UNIT READY UPIU. The host 1100 may determine whether a boot logical unit (or a boot well-known LU) of the storage device 1200 is accessible, based on the received status information.

In the case where the boot logical unit is accessible, the host 1100 may transfer a SCSI READ command to the storage device 1200. In an exemplary embodiment of the inventive concept, the SCSI READ command may correspond to the boot logical unit. The storage device 1200 may transfer data "DATA" and status information to the host 1100 in response to the received command.

In operation S16, the host 1100 may complete the initialization operation by setting a flag of the storage device 1200. For example, the host 1100 may transfer the query request to the storage device 1200. The query request may be a request for setting a device initialization field (e.g., "fDeviceInit") included in the flag of the storage device 1200. In response to the query request, the device initialization field included in the flag of the storage device 1200 may be set to a particular value (e.g., "01h"). Afterwards, the storage device 1200 may transfer a query response.

In operation S17, the host 1100 may poll the device initialization field (e.g., "fDeviceInit") of the flag of the storage device 1200. For example, the host 1100 may transfer a query request for reading the device initialization field of the flag to the storage device 1200, and the storage device 1200 may transfer a query response, in which the device initialization field is included, to the host 1100.

In an exemplary embodiment of the inventive concept, after operation S16, in the case where the initialization operation of the storage device 1200 is completed, the device initialization field may be reset to a different value (e.g., "00h"). In other words, the host 1100 may repeatedly perform operation S17 to check whether the device initialization field is reset. In the case where the device initialization field is reset, the initialization operation of the host 1100 and the storage device 1200 may be completed.

Figure 7:
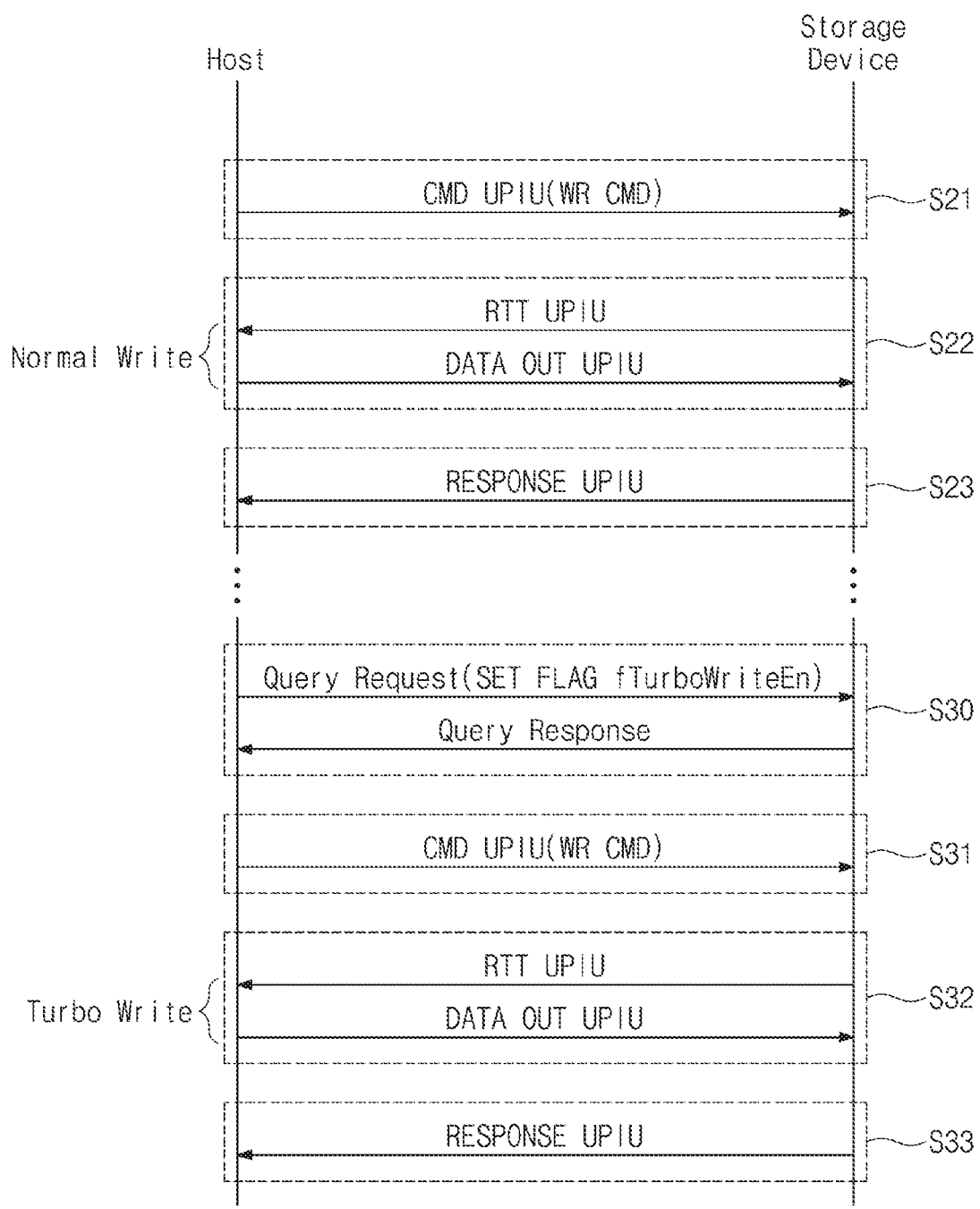
FIG. 7 is a flowchart illustrating an operation of a storage system of FIG. 1 according to an exemplary embodiment of the inventive concept.

FIG. 7 is a flowchart illustrating an operation of a storage system of FIG. 1. A write operation of the storage system 1000 will be described with reference to FIGS. 1 and 7. In operation S21, the host 1100 may transfer a CMD UPIU including a write command WR CMD to the storage device 1200.

In operation S22, the host 1100 and the storage device 1200 may perform data transaction. For example, the storage device 1200 may transfer a ready to transfer UPIU (RTT UPIU) to the host 1100. The RTT UPIU may include information about a data range where the storage device 1200 is able to receive data. The host 1100 may transfer a DATA OUT UPIU including the write data to the storage device 1200 in response to the RTT UPIU. As the above-described operation is repeatedly performed, the write data may be transferred from the host 1100 to the storage device 1200.

After all of the write data are received, in operation S23, the storage device 1200 may transfer a RESPONSE UPIU to the host 1100. The RESPONSE UPIU may include information indicating that an operation corresponding to the write command received in operation S21 is completed.

In an exemplary embodiment of the inventive concept, the storage device 1200 may perform a normal write operation on the write data received in operation S22. For example, in operation S21, the storage device 1200 may determine whether the turbo write function is enabled. More specifically, the storage device 1200 may determine whether the turbo write function is enabled, based on a value of a turbo write enable field (e.g., "fTurboWriteEn") of the flag.

In the case where a value of the turbo write enable field is "0b", the turbo write function may be in a disabled state. In the case where a value of the turbo write enable field is "1b", the turbo write function may be in an enabled state. In an exemplary embodiment of the inventive concept, a value of the turbo write enable field of the flag may be set by a query request for a set flag of the host 1100.

A value of the turbo write enable field may not be set by the host 1100. In this case, the write data received in operation S22 may be written in the turbo write buffer TWB or the user storage UST in compliance with the normal write policy.

In operation S30, the host 1100 may set a value of the turbo write enable field to a particular value (e.g., "1b"). For example, the host 1100 may transfer a query request for setting a value of the turbo write enable field to a particular value (e.g., "1b") to the storage device 1200. A value of the turbo write enable field may be set to a particular value (e.g., "1b") in response to the query request from the host 1100, and the storage device 1200 may transfer a query response to the host 1100.

Afterwards, the host 1100 may perform operation S31 to operation S33. Operation S31 to operation S33 may be similar to operation S21 to operation S23 except that the turbo write is performed depending on the turbo write enable field, and thus, additional description will be omitted to avoid redundancy.

In an exemplary embodiment of the inventive concept, the write data received in operation S32 may be written in the turbo write buffer TWB. For example, in operation S30, as a value of the turbo write enable field is set to a particular value (e.g., "1b"), the turbo write function may be enabled. In this case, the write data received from the host 1100 may be written in the turbo write buffer TWB. For example, in operation S31, the data received from the host 1100 may be stored in the pinned turbo write buffer TWB-p or the non-pinned turbo write buffer TWB-np depending on a particular factor value of the command UPIU. How to configure a turbo write buffer divided into the pinned turbo write buffer TWB-p and the non-pinned turbo write buffer TWB-np will be more fully described with reference to FIG. 9.

In an exemplary embodiment of the inventive concept, even though the turbo write function is enabled, in the case where a space of the turbo write buffer TWB is insufficient, the storage device 1200 may write the received write data in the user storage UST.

Figure 8:
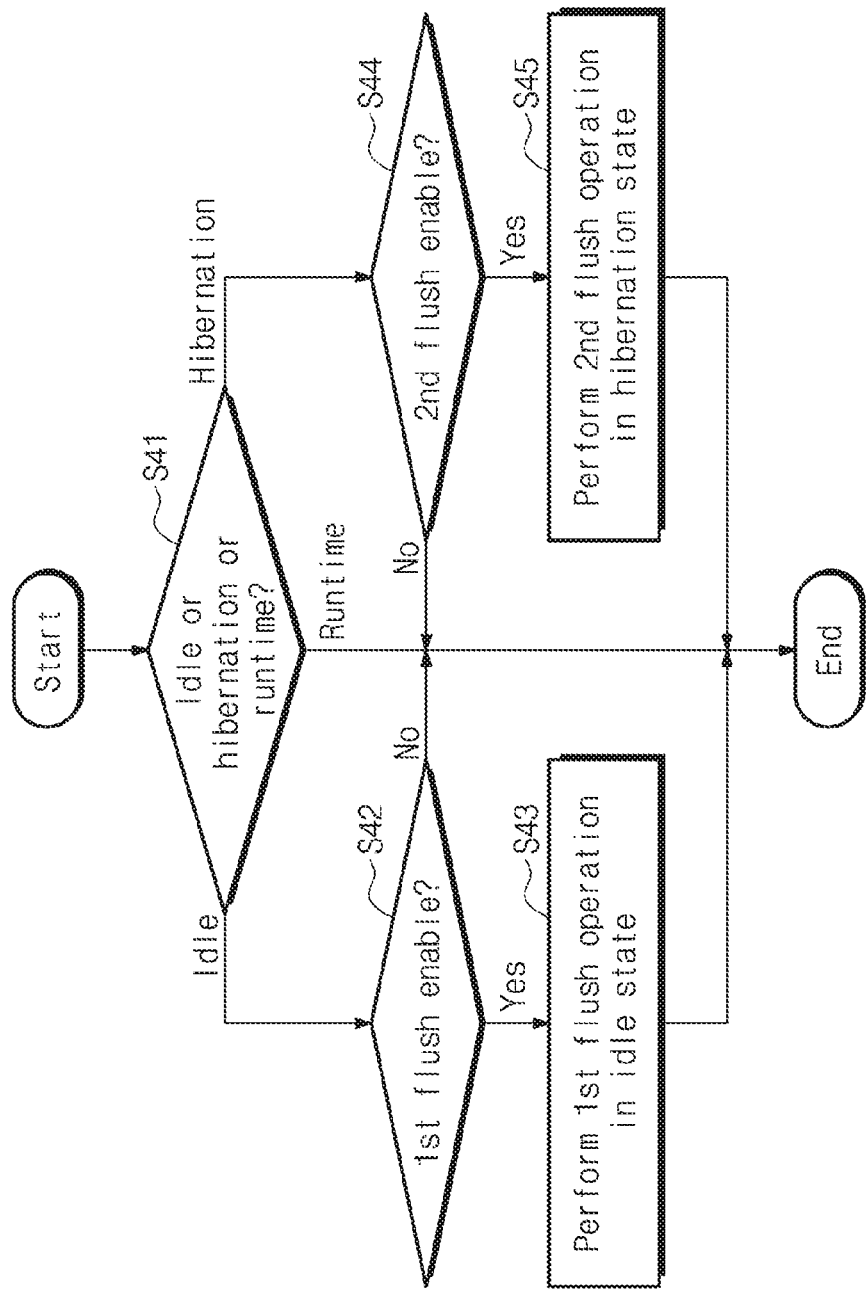
FIG. 8 is a flowchart illustrating an operation of a storage device of FIG. 1 according to an exemplary embodiment of the inventive concept.

FIG. 8 is a flowchart illustrating an operation of a storage device of FIG. 1. A flush operation of the storage device 1200 will be described with reference to FIGS. 1, 2, and 8. In operation S41, the storage device 1200 may determine whether a current state is an idle state, a hibernation state, or a runtime state. When the storage device 1200 is in the runtime state, a separate flush operation may not be performed.

For example, when the storage device 1200 is processing a command received from the host 1100, the storage device 1200 may be in the runtime state. When a command (e.g., a pending command) that is received from the host 1100 and is being processed or to be processed does not exist, the storage device 1200 may be in the idle state. When the storage device 1200 enters a low-power mode called "hibernation" by the initiation of the storage device 1200 or the host 1100, the storage device 1200 may be in the hibernation state.

When the storage device 1200 is in the idle state, in operation S42, whether a first flush operation is enabled may be determined. The host 1100 may allow or prohibit the first flush operation at the storage device 1200 by setting a value of a turbo write buffer flush enable field (e.g., "fTurboWriteBufferFlushEn") of the flag. The storage device 1200 may determine whether the first flush operation is enabled, by checking a value of the turbo write buffer flush enable field of the flag.

In an exemplary embodiment of the inventive concept, when a value of the turbo write buffer flush enable field of the flag is "0b", the first flush operation may be disabled or prohibited. When a value of the turbo write buffer flush enable field of the flag is "1b," the first flush operation may be enabled. In the case where the first flush operation is disabled, the storage device 1200 may not perform a separate flush operation.

In the case where the first flush operation is enabled, in operation S43, the storage device 1200 may perform the first flush operation during the idle state. The first flush operation may be a flush operation that the storage device 1200 performs in the idle state. The flush operation may be an operation of flushing or migrating user data written in the turbo write buffer TWB to the user storage UST, depending on the internal policy or the explicit command from the host 1100.

In an exemplary embodiment of the inventive concept, when the user data written in the turbo write buffer TWB are flushed to the user storage UST, a logical address of the flushed user data may be maintained, and a physical address may be changed. In this case, the storage device 1200 may update mapping information of the logical address and the physical address of the flushed user data. For example, the physical address may be changed from an address of the turbo write buffer TWB to an address of the user storage UST.

When a determination result of operation S41 indicates that the storage device 1200 is in the hibernation state, in operation S44, the storage device 1200 may determine whether a second flush operation is enabled.

As in the above description, for example, the host 1100 may allow or prohibit the second flush operation at the storage device 1200 by setting a value of a turbo write buffer flush enable field during hibernation (e.g., "fTurboWriteBufferFlushDuringHibernat") of the flag.

The storage device 1200 may determine whether the second flush operation is enabled, by checking the value of the turbo write buffer flush enable field during hibernation of the flag. In an exemplary embodiment of the inventive concept, when a value of the turbo write buffer flush enable field during hibernation of the flag is "0b", the second flush operation may be disabled or prohibited. When a value of the turbo write buffer flush enable field during hibernation of the flag is "1b", the second flush operation may be enabled. In the case where the second flush operation is disabled, the storage device 1200 may not perform a separate flush operation.

In the case where the second flush operation is enabled, in operation S45, the storage device 1200 may perform the second flush operation during the hibernation state. The second flush operation may indicate a flush operation that the storage device 1200 performs in the hibernation state.

According to the above flush operation, user data written in the turbo write buffer TWB may be flushed or migrated to the user storage UST. As such, an available buffer size of the turbo write buffer TWB may be secured.

In an exemplary embodiment of the inventive concept, the above flush operation may be suspended under a particular condition. For example, the first flush operation that is performed in the idle state may be performed only in a state where a command queue of the storage device 1200 is empty. While the first flush operation is performed, in the case where a command is issued from the host 1100, the storage device 1200 may suspend the first flush operation being performed and may first process the command issued from the host 1100. In an exemplary embodiment of the inventive concept, in the case where the hibernation mode is terminated, the second flush operation that is performed in the hibernation state may be stopped.

As described above, a flush operation being performed may be suspended depending on a particular condition. In this case, the storage device 1200 may set suspension information (or information of the progress degree) or a current status of the flush operation at a turbo write buffer flush status field (e.g., "bTurboWriteBufferFlushStatus") of the attributes.

In an exemplary embodiment of the inventive concept, the storage device 1200 may set information, which indicates that a flush operation for the turbo write buffer TWB is required, to a particular value (e.g., bit[5]) of an exception event status (e.g., "dExceptionEventStatus") of the attributes. The host 1100 may check the particular value (e.g., bit[5]) of the exception event status of the attributes, may determine that a flush operation is required at the storage device 1200, and may set particular fields (e.g., "fTurboWriteBufferFlushEn" and "fTurboWriteBufferFlushDuringHibernate") of the flag of the storage device 1200 in compliance with a policy.

The description is given with reference to FIG. 8 as the storage device 1200 performs a flush operation based on a value of a flush enable field (i.e., a value of the turbo write buffer flush enable field or a value of the turbo write buffer flush enable field during hibernation), but the inventive concept is not limited thereto. In an exemplary embodiment, the storage device 1200 performs a flush or migration operation depending on an internal policy, regardless of a value of the flush enable field (i.e., a value of the turbo write buffer flush enable field or a value of the turbo write buffer flush enable field during hibernation). In this case, the storage device 1200 may perform the flush or migration operation depending a result of determination that is automatically made by the storage device 1200 (without intervention of the outside, or according to its own determination).

Figure 9:
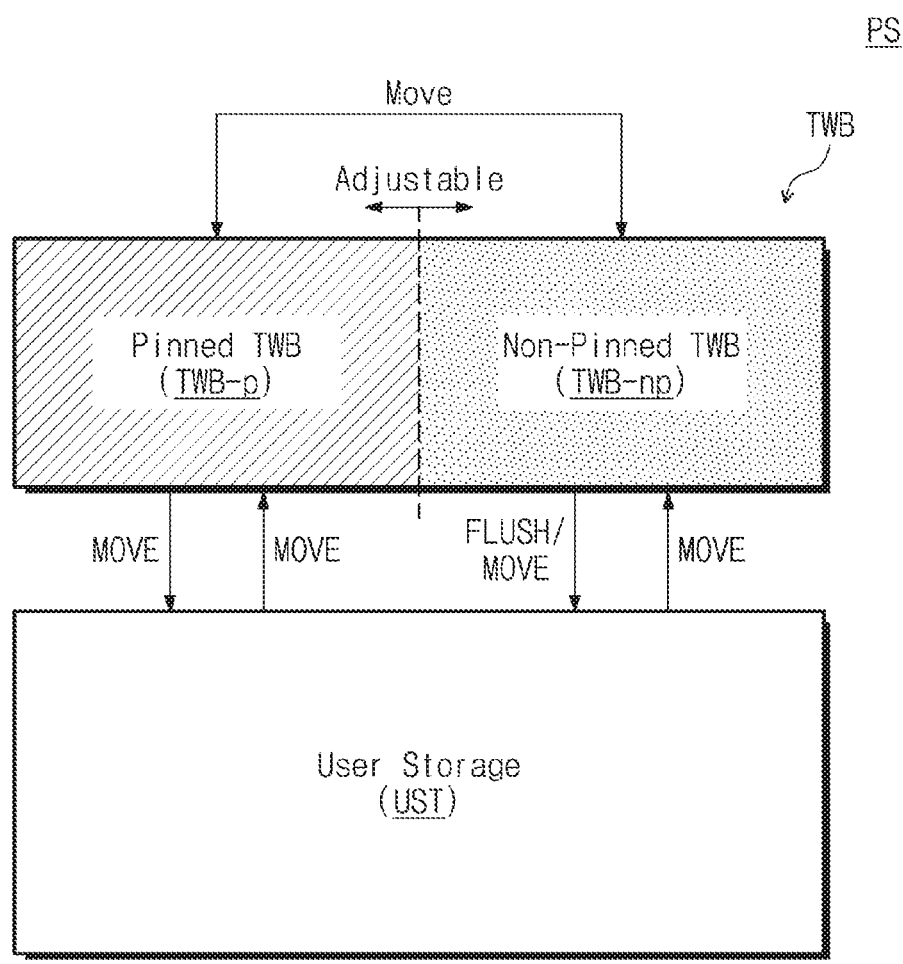
FIG. 9 illustrates a physical storage space of a storage device of FIG. 1 according to an exemplary embodiment of the inventive concept.

FIG. 9 is a block diagram illustrating a physical storage space of the storage device 1200 of FIG. 1. Referring to FIGS. 1 and 8, the physical storage space PS of the storage device 1200 may include the turbo write buffer TWB and the user storage UST. The physical storage space PS, the turbo write buffer TWB, and the user storage UST of the storage device 1200 are described above, and thus, additional description may be omitted to avoid redundancy.

The turbo write buffer TWB may be divided into a pinned turbo write buffer TWB-p and a non-pinned turbo write buffer TWB-np. As in the above description, in the case where the turbo write function of the storage device 1200 is enabled, the write data may be stored in one of the pinned turbo write buffer TWB-p and the non-pinned turbo write buffer TWB-np.

In an embodiment, data stored in the pinned turbo write buffer TWB-p is not targeted for a move (e.g., a migrate or a flush) to the user storage UST, and data stored in the non-pinned turbo write buffer TWB-np may be targeted for a move to the user storage UST. That is, a priority of data stored in the pinned turbo write buffer TWB-p may be higher than a priority of data stored in the non-pinned turbo write buffer TWB-np. However, the inventive concept is not limited thereto as data stored in the pinned turbo write buffer TWB-p may be targeted for a move to the non-pinned turbo write buffer TWB-np or the user storage UST depending on resources or a policy of a system. In an exemplary embodiment, a migration or flush operation is periodically performed to move data from the turbo write buffer TWB to the user storage UST. In this embodiment, all data present in the non-pinned turbo write buffer TWB-np is first migrated or flushed to the user storage UST before any data of the pinned turbo write buffer TWB-p is migrated or flushed to the user storage UST. In another embodiment, during a given migration, first data in the non-pinned turbo write buffer TWB-np is migrated to the user storage UST during a first period of the migration and second data in the pinned turbo write buffer TWB-p is migrated to the user storage UST during a second period after the first period.

One, in which the write data are to be stored, from among the pinned turbo write buffer TWB-p and the non-pinned turbo write buffer TWB-np may be determined through various schemes (e.g., an internal policy, a change of the internal policy according to a request of a host, and an explicit request of a host).

In an exemplary embodiment of the inventive concept, as described above, the size of the turbo write buffer TWB may be determined under control of the host 1100 or depending on the internal policy of the storage device 1200. In this case, a ratio of the pinned turbo write buffer TWB-p and the non-pinned turbo write buffer TWB-np in the turbo write buffer TWB may be determined or varied through various schemes (e.g., an internal policy, a change of the internal policy according to a request of a host, and an explicit request of a host).

In an exemplary embodiment of the inventive concept, user data may be flushed, migrated, or moved between the pinned turbo write buffer TWB-p, the non-pinned turbo write buffer TWB-np, and the user storage UST. For example, the user data may migrate or move between the pinned turbo write buffer TWB-p and the non-pinned turbo write buffer TWB-np depending on an explicit request of the host 1100, an internal policy of the storage device 1200, or a change of the internal policy according to a request of the host 1100.

Alternatively, the user data may migrate or move between the non-pinned turbo write buffer TWB-np and the user storage UST depending on the explicit request of the host 1100, the internal policy of the storage device 1200, or the change of the internal policy according to the request of the host 1100. For example, the user data may be flushed from the non-pinned turbo write buffer TWB-np to the user storage UST. Alternatively, the user data may migrate or move between the pinned turbo write buffer TWB-p and the user storage UST depending on the explicit request of the host 1100, the internal policy of the storage device 1200, or the change of the internal policy according to the request of the host 1100.

In an exemplary embodiment of the inventive concept, as described with reference to FIG. 8, the storage device 1200 may perform a flush operation during the idle state or the hibernation state. In this case, the storage device 1200 may perform the flush operation on the non-pinned turbo write buffer TWB-np of the turbo write buffer TWB. In other words, the storage device 1200 may flush the user data stored in the non-pinned turbo write buffer TWB-np of the turbo write buffer TWB to the user storage UST. In this case, the user data written in the pinned turbo write buffer TWB-p may not be flushed to the user storage UST. In other words, even though the storage device 1200 performs the flush operation, the user data written in the pinned turbo write buffer TWB-p may be maintained.

As another example, depending on the internal policy of the storage device 1200, data to be stored in the non-pinned turbo write buffer TWB-np may be written in the pinned turbo write buffer TWB-p. This data may be flushed from the pinned turbo write buffer TWB-p to the user storage UST. In other words, data stored in the pinned turbo write buffer TWB-p may not be flushed by an explicit flush request from the host 1100, but may be selectively flushed to the user storage UST depending on the internal flush policy of the storage device 1200.

In an exemplary embodiment of the inventive concept, in the case where data are flushed, migrated, or moved between the pinned turbo write buffer TWB-p, the non-pinned turbo write buffer TWB-np, and the user storage UST, the controller 1210 may be configured to update a mapping relationship of the moved data. For example, in the case where data corresponding to a first logical block address is flushed or migrated from the pinned turbo write buffer TWB-p to the user storage UST, the controller 1210 may release a mapping relationship of the first logical block address and a physical address of the pinned turbo write buffer TWB-p and may update a mapping relationship of the first logical block address and a physical address of the user storage UST. The release or update of the mapping relationship may be made in a scheme similar to that described above for moving between other areas, and thus, additional description will be omitted to avoid redundancy.

Below, to explain the inventive concept more clearly, a description will be given under the assumption that data to be stored in the pinned turbo write buffer TWB-p is required to be stored in the pinned turbo write buffer TWB-p. However, the inventive concept is not limited thereto.

Accordingly, in the case where the host 1100 issues a read command for first user data written in the pinned turbo write buffer TWB-p, the first user data may be read from the pinned turbo write buffer TWB-p. In this case, it may be possible to read the first user data at a high speed. For example, as described above, the pinned turbo write buffer TWB-p may store user data based on the SLC scheme, and the user storage UST may store user data in the TLC scheme. A time taken to read user data stored based on the SLC scheme is shorter than a time taken to read user data stored based on the TLC scheme. In other words, as particular user data are retained in the pinned turbo write buffer TWB-p, a speed at which the particular user data are read may be improved. This function of the storage device 1200 may be called "turbo read".

In an exemplary embodiment of the inventive concept, the physical storage space PS of the storage device 1200 may indicate a storage space of the nonvolatile memory device 1220. In other words, the nonvolatile memory device 1220 may include the pinned turbo write buffer TWB-p, the non-pinned turbo write buffer TWB-np, or the user storage UST.

Figure 10:
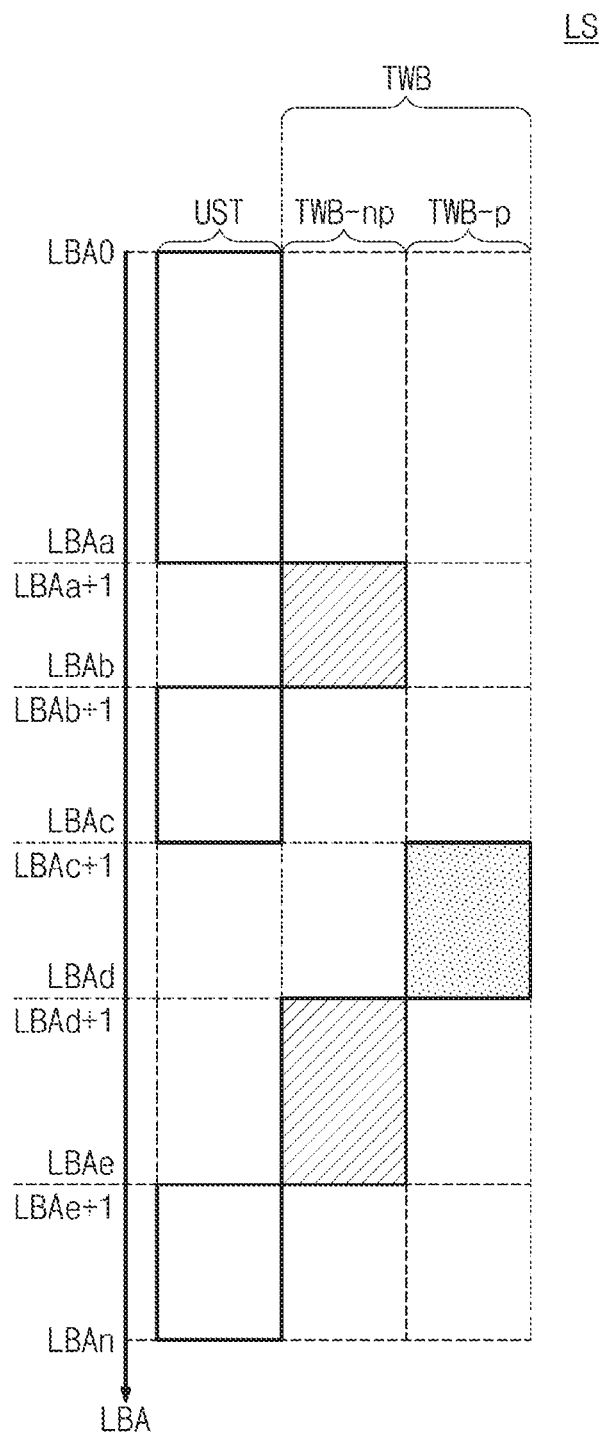
FIG. 10 illustrates a logical storage space for a physical storage space of a storage device described with reference to FIG. 9 according to an exemplary embodiment of the inventive concept.

FIG. 10 is a diagram illustrating a logical storage space for the physical storage space PS of the storage device 1200 described with reference to FIG. 9 according to an exemplary embodiment of the inventive concept. For convenience of description, the embodiment of FIG. 10 will be described with reference to one logical unit. However, the inventive concept may be identically applied to two or more logical units to which the turbo write buffers TWB correspond, or a relationship between logical units and a shared turbo write buffer (e.g., TWB0). Referring to FIGS. 1 and 10, a logical storage space LS of the storage device 1200 that is identified by the host 1100 may include the user storage UST and the turbo write buffer TWB. The turbo write buffer TWB may include the pinned turbo write buffer TWB-p and the non-pinned turbo write buffer TWB-np.

A first logical block address range (e.g., LBA0 to LBAa, LBAb+1 to LBAc, and LBAe+1 to LBAn) may correspond to a logical storage space of the user storage UST. In this case, user data stored in the first logical block address range (e.g., LBA0 to LBAa, LBAb+1 to LBAc, and LBAe+1 to LBAn) may be stored in a physical storage space of the user storage UST.

A second logical block address range (e.g., LBAa+1 to LBAb and LBAd+1 to LBAe) may correspond to a logical storage space of the non-pinned turbo write buffer TWB-np. In this case, user data stored in the second logical block address range (e.g., LBAa+1 to LBAb and LBAd+1 to LBAe) may be stored in a physical storage space of the non-pinned turbo write buffer TWB-np.

A third logical block address range (e.g., LBAc+1 to LBAd) may correspond to a logical storage space of the pinned turbo write buffer TWB-p. In this case, user data stored in the third logical block address range (e.g., LBAc+1 to LBAd) may be stored in a physical storage space of the pinned turbo write buffer TWB-p.

As described above, the user storage UST, the non-pinned turbo write buffer TWB-np, and the pinned turbo write buffer TWB-p may be distributed in various forms on the logical storage space LS recognized by the host 1100. However, the inventive concept is not limited thereto and the third logical block address range may correspond to a logical storage space of the non-pinned turbo write buffer TWB-np and the second logical block address range may correspond to a logical storage space of the pinned turbo write buffer TWB-p. In an exemplary embodiment of the inventive concept, user data may be moved/flushed/migrated between the user storage UST, the non-pinned turbo write buffer TWB-np, and the pinned turbo write buffer TWB-p, depending on the explicit request of the host 1100 or the internal policy of the storage device 1200.

For example, the host 1100 may specify one of the pinned turbo write buffer TWB-p and the non-pinned turbo write buffer TWB-np in the turbo write. As another example, the host 1100 may specify one of the pinned turbo write buffer TWB-p and the non-pinned turbo write buffer TWB-np as a turbo write target before the turbo write. As yet another example, the host 1100 may not specify the pinned turbo write buffer TWB-p or the non-pinned turbo write buffer TWB-np in the turbo write.

The host 1100 may check a distribution state of data changed by the storage device 1200 by requesting (e.g., using the Query UPIU) information of the pinned turbo write buffer TWB-p and the non-pinned turbo write buffer TWB-np from the storage device 1200 periodically or if necessary.

Figure 11A:
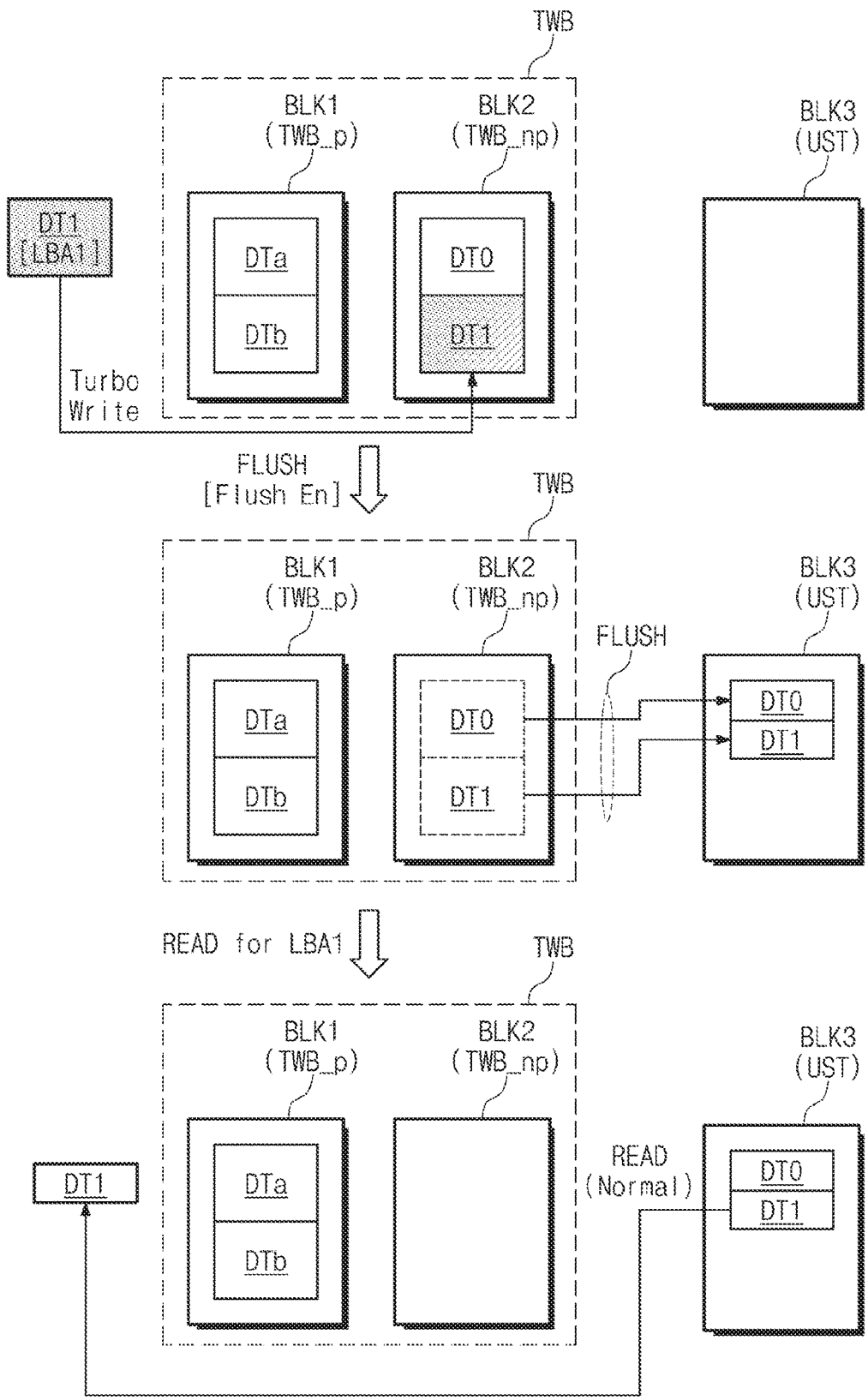
FIGS. 11A and 11B illustrate an operation in a physical storage space of a storage device described with reference to FIG. 9 according to an exemplary embodiment of the inventive concept.
Figure 11B:
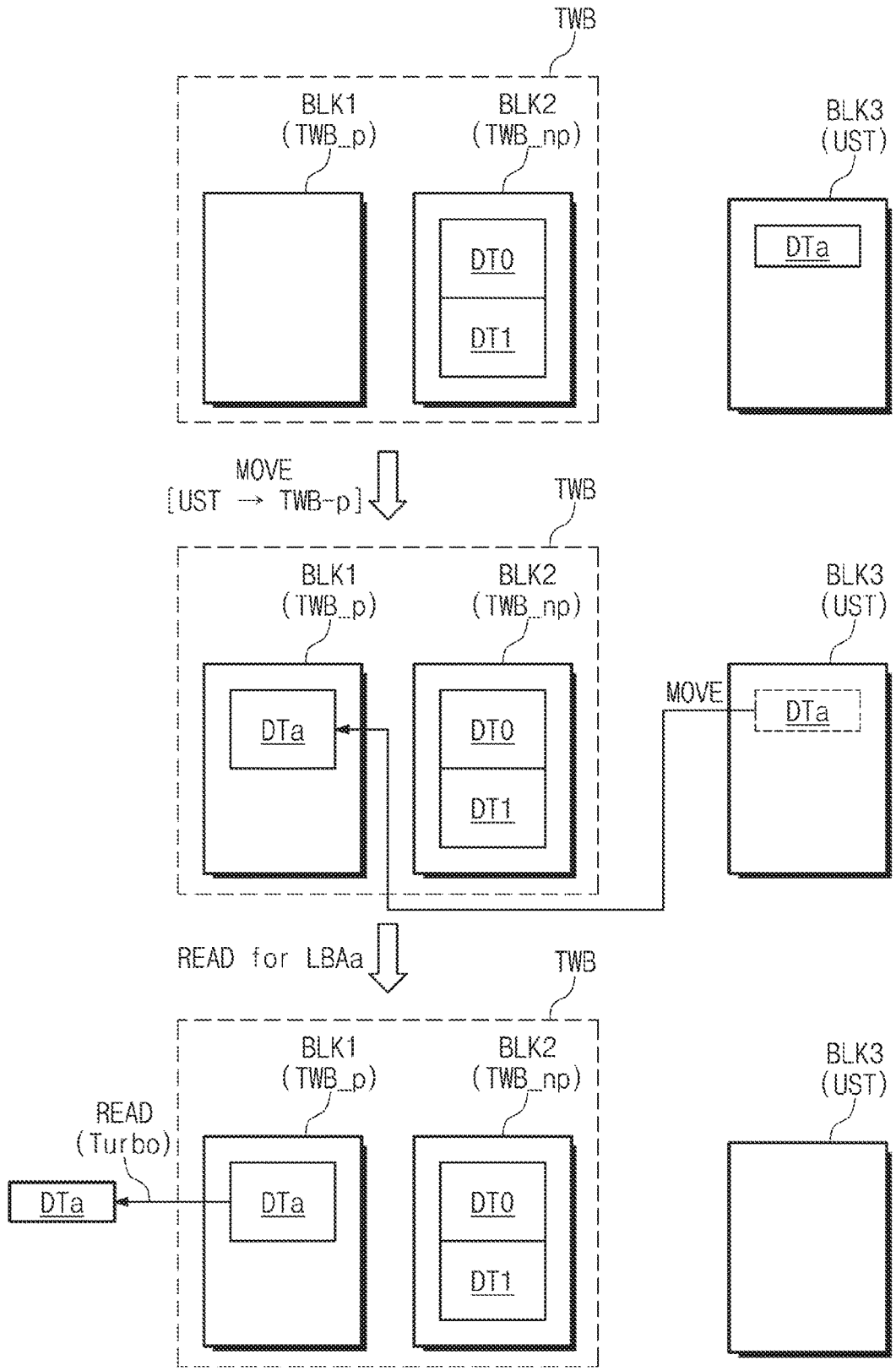

FIGS. 11A and 11B are diagrams illustrating an operation in a physical storage space of a storage device described with reference to FIG. 9 according to an exemplary embodiment of the inventive concept. For brevity of illustration and convenience of description, it is assumed that the pinned turbo write buffer TWB-p includes a first memory block BLK1, the non-pinned turbo write buffer TWB-np includes a second memory block BLK2, and the user storage UST may include a third memory block BLK3. However, the inventive concept is not limited thereto.

Referring to FIGS. 1, 9, and 11A, the storage device 1200 may receive first data DT1 corresponding to a first logical block address LBA1 from the host 1100. In an exemplary embodiment of the inventive concept, the turbo write function of the storage device 1200 may be in an enabled state. In this case, the storage device 1200 may write the received first data DT1 in the turbo write buffer TWB (e.g., the non-pinned turbo write buffer TWB-np). In other words, the storage device 1200 may perform the turbo write on the first data DT1. In an exemplary embodiment of the inventive concept, in the case where the turbo write function is enabled, whether to store data in any one of the pinned turbo write buffer TWB-p and the non-pinned turbo write buffer TWB-np may be determined through various schemes.

In an exemplary embodiment of the inventive concept, as illustrated in FIG. 11A, the pinned turbo write buffer TWB-p and the non-pinned turbo write buffer TWB-np may be full of user data DTa, DTb, DT0, and DT1. In this case, the storage device 1200 may notify the host 1100 that a flush operation is required, by setting a particular bit (e.g., bit[5]) of an exception event status field (e.g., "wExceptionEventStatus") of the attributes.

The host 1100 may check the exception event status field of the attributes through a query request and may check that the flush operation is required at the storage device 1200. The host 1100 may allow the flush operation of the storage device 1200 by setting the turbo write buffer flush enable field or the turbo write buffer flush enable field during hibernation of the flag of the storage device 1200 as described with reference to FIG. 8.

When the flush function is allowed (or enabled) under control of the host 1100, the storage device 1200 may perform the flush operation. For example, in the idle state or the hibernation state, the storage device 1200 may flush the user data DT0 and DT1 stored in the non-pinned turbo write buffer TWB-np to the third memory block BLK3 of the user storage UST. In an exemplary embodiment of the inventive concept, even though the flush operation is allowed under control of the host 1100, the user data DTa and DTb stored in the pinned turbo write buffer TWB-p may not be flushed to the user storage UST. In other words, the user data DTa and DTb stored in the pinned turbo write buffer TWB-p remains while the user data DT0 and DT1 stored in the non-pinned turbo write buffer TWB-np is flushed.

Afterwards, the storage device 1200 may receive a read command for the first logical address LBA1 from the host 1100. In this case, the storage device 1200 may read the first data DT1 stored in the third memory block BLK3 of the user storage UST and may output the read first data DT1 to the host 1100.

In an exemplary embodiment of the inventive concept, because the first data DT1 are written (e.g., SLC programmed) in the non-pinned turbo write buffer TWB-np but the first data DT1 are flushed to the user storage UST due to the flush operation, the first data DT1 may be read through a normal read operation (e.g., a TLC read operation). In other words, the first data DT1 may be SLC programmed but TLC read.

Referring to FIGS. 1, 9, and 11B, the 0-th and first data DT0 and DT1 may be stored in the second memory block BLK2 of the non-pinned turbo write buffer TWB-np, and the a-th data DTa may be stored in the third memory block BLK3 of the user storage UST.

Afterwards, depending on the explicit request of the host 1100 or the internal policy of the storage device 1200, the a-th data DTa of the user storage space UST may move to the first memory block BLK1 of the pinned turbo write buffer TWB-p. For example, the storage device 1200 may read the a-th data DTa from the third memory block BLK3 of the user storage UST and may store the read a-th data DTa in the first memory block BLK1 of the pinned turbo write buffer TWB-p. Afterwards, the a-th data DTa stored in the third memory block BLK3 of the user storage UST may be invalidated, deleted, or unmapped. In an exemplary embodiment of the inventive concept, even though the a-th data DTa are invalidated, deleted, or unmapped, an a-th logical block address LBAa corresponding to the a-th data DTa may maintain mapping with the first memory block BLK1 of the pinned turbo write buffer TWB-p.

Afterwards, the storage device 1200 may receive a read command for the a-th logical block address LBAa corresponding to the a-th data DTa from the host 1100. In this case, the storage device 1200 may read the a-th data DTa stored in the first memory block BLK1 of the pinned turbo write buffer TWB-p and may transfer the read a-th data DTa to the host 1100.

In an exemplary embodiment of the inventive concept, an operation of reading the a-th data DTa stored in the first memory block BLK1 of the pinned turbo write buffer TWB-p may be faster than an operation of reading data stored in the third memory block BLK3 of the user storage UST. In other words, the storage device 1200 according to an exemplary embodiment of the inventive concept may support a fast read operation (e.g., a turbo read operation) with regard to particular data, by storing and retaining the particular data in the turbo write buffer TWB (or the pinned turbo write buffer TWB-p).

In an exemplary embodiment of the inventive concept, the storage device 1200 may inform the host 1100 of the remaining (or free) capacity of the turbo write buffer TWB in response to a request of the host 1100. The storage device 1200 may write information about the remaining free capacity of the turbo write buffer TWB to an available turbo write buffer size field (e.g., "dAvailableTurboWriteBufferSize") of the attributes. The host 1100 may obtain capacity information of the turbo write buffer TWB by reading the available turbo write buffer size field (e.g., by using the Query UPIU).

For example, the storage device 1200 may separately record the remaining capacity of the pinned turbo write buffer TWB-p and the remaining capacity of the non-pinned turbo write buffer TWB-np at the available turbo write buffer size field. As another example, the storage device 1200 may record a total of the remaining capacity of the turbo write buffer TWB at the available turbo write buffer size field. Whether the storage device 1200 records the remaining capacity of the turbo write buffer TWB integrally or individually may be specified through flag setting of the host 1100.

For example, the storage device 1200 may record a smaller capacity than an actual free capacity of the turbo write buffer TWB at the available turbo write buffer size field. In the nonvolatile memory device 1220 such as a flash memory, in the case where a time between consecutive erase operations is smaller than a threshold time, the reliability of data may decrease.

Because the capacity of the turbo write buffer TWB is smaller than the capacity of the user storage UST and the turbo write buffer TWB is used in the SLC scheme, the turbo write buffer TWB may be filled with data more quickly than the user storage UST. In addition, in the case where the host 1100 prefers the turbo write of a high speed, the turbo write buffer TWB may be full of data more quickly.

In the case where data are intensively written in the turbo write buffer TWB, during a short time window, there are performed the following series of operations: a first erase operation is performed on the turbo write buffer TWB, data are written in the turbo write buffer TWB, the data of the turbo write buffer TWB are flushed, a second erase operation is performed on the turbo write buffer TWB, and data are written in the turbo write buffer TWB.

In this case, when a time between the first erase operation and the second erase operation is smaller than the threshold time, the reliability of data that are written in the turbo write buffer TWB after the second erase operation may decrease. To increase reliability, even though a particular memory block of the turbo write buffer TWB does not store valid data and is reusable after an erase operation, when a time passing after a previous erase operation of the particular memory block is smaller than the threshold time, the storage device 1200 may record a capacity, from which a capacity of the particular memory block is excluded, at the available turbo write buffer size field.

FIG. 12 is a flowchart illustrating operations of a storage system of FIG. 1 according to an exemplary embodiment of the inventive concept. A read operation of the storage system 1000 will be described with reference to FIGS. 1 and 12.

In operation S51, the host 1100 transfers a command UPIU including the read command RD CMD and a logical address of read data to the storage device 1200. For example, the command UPIU transferred in operation S51 does not include a move factor MV associated with a move from the user storage UST to the turbo write buffer TWB-p or TWB-np.

In operation S52, the storage device 1200 transfers the DATA IN UPIU including the read data to the host 1100. The read data is data read from the user storage UST, but not data read from the turbo write buffer TWB-p or TWB-np.

After the read data is completely transferred, in operation S53, the storage device 1200 transfers the RESPONSE UPIU to the host 1100. The RESPONSE UPIU may include information indicating that an operation corresponding to the read command transferred in operation S52 has completed. In addition, the RESPONSE UPIU may include information indicating that the read data obtained depending on the read command RD CMD was not read from the turbo write buffer TWB-p or TWB-np. For example, the RESPONSE UPIU may include miss information indicating that a miss occurred because the read data could not be read from the turbo write buffer TWB-p or TWB-np.

Meanwhile, in the present embodiment, because the command UPIU does not include the move factor MV, only the miss information is provided with regard to the data read from the user storage UST, and an additional operation (e.g., a move of data stored in the user storage UST to the turbo write buffer TWB-p or TWB-np) is not performed. Therefore, a logical address and a physical address "X" of the read data may be maintained without modification.

Unlike the embodiment of operation S51 to operation S53, an embodiment of operation S61 to operation S63 relates to the case where a normal read operation accompanies the data move.

In operation S61, the host 1100 may transfer a command UPIU including the read command RD CMD and a logical address of read data to the storage device 1200. The command UPIU transferred in operation S61 includes the move factor MV associated with a move from the user storage UST to the turbo write buffer TWB-p or TWB-np. For example, the move factor MV may include information indicating that a move of data is required, information indicating a destination (e.g., the pinned turbo write buffer TWB-p or the non-pinned turbo write buffer TWB-np) to which data are to be moved, etc.

In operation S62, the storage device 1200 may transfer the DATA IN UPIU including the read data read from the user storage UST to the host 1100. At the same time, the storage device 1200 may move the read data read from the user storage UST to the pinned turbo write buffer TWB-p or the non-pinned turbo write buffer TWB-np depending on the move factor MV. Alternatively, a move of data to the turbo write buffer TWB-p or TWB-np may be performed after the DATA IN UPIU is transferred to the host 1100. Since data is moved to the turbo write buffer TWB-p or TWB-np, a logical address of the read data is maintained, and a physical address "Y" thereof may be changed to a physical address Y1 or Y2.

After the read data has completely transferred, in operation S63, the storage device 1200 may transfer the RESPONSE UPIU to the host 1100. The RESPONSE UPIU may include information (e.g., MISS) indicating that the read data obtained depending on the read command RD CMD was not read from the turbo write buffer TWB-p or TWB-np. In addition, the RESPONSE UPIU may include information indicating that the read data was moved from the user storage UST to the pinned turbo write buffer TWB-p or the non-pinned turbo write buffer TWB-np.

Unlike the embodiments described in operation S51 to operation S63, an embodiment of operation S71 to operation S73 relates to an embodiment in which data is read from the turbo write buffer TWB-p or TWB-np.

The host 1100 may transfers a command UPIU including the read command RD CMD and a logical address of read data to the storage device 1200 (S71). Afterwards, the storage device 1200 transfers the DATA IN UPIU including the read data read from the turbo write buffer TWB-p or TWB-np to the host 1100 (S72). After the read data has completely transferred, the storage device 1200 transfers the RESPONSE UPIU to the host 1100 (S73). In this case, the RESPONSE UPIU may include information (e.g., HIT) indicating that the read data obtained depending on the read command RD CMD was read from the turbo write buffer TWB-p or TWB-np.

Figure 13:
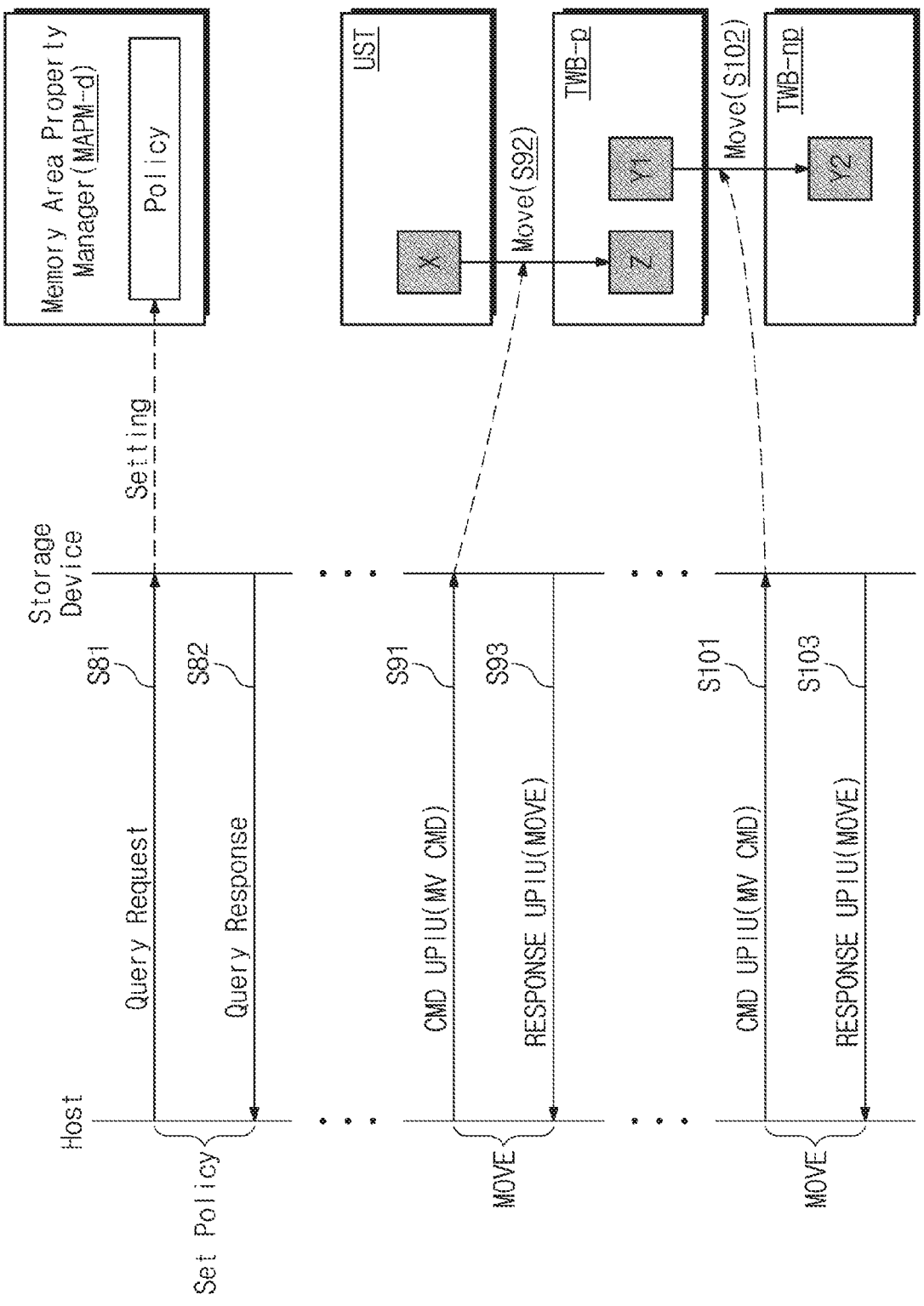
FIG. 13 is a flowchart illustrating operations of a storage system of FIG. 1 according to an exemplary embodiment of the inventive concept.

FIG. 13 is a flowchart illustrating operations of a storage system of FIG. 1 according to an exemplary embodiment of the inventive concept. A move of data accompanied in a read operation is described with reference to FIG. 12. The present embodiment relates to a move of data not associated with a read operation. A move operation of the storage system 1000 will be described with reference to FIGS. 1, 2, and 13.

In operation S81, the host 1100 transfers a query request for managing the turbo write buffers TWB-p and TWB-np to the storage device 1200. The memory area property manager MAPM-d may set a policy for managing the turbo write buffers TWB-p and TWB-np depending on the query request. Various policies that are set by the memory area property manager MAPM-d will be more fully described with reference to FIGS. 14A to 14C and 15.

In operation S82, the storage device 1200 transfers, to the host 1100, a query response including information indicating that a policy for managing the turbo write buffers TWB-p and TWB-np is set.

In operation S91, the host 1100 transfers, to the storage device 1200, a command UPIU including a move command MV CMD and a logical address of an area in which data to be moved are stored. The command UPIU may include a field at which information about a destination (i.e., TWB-p) to which data are to be moved is recorded.

In operation S92, data stored in the user storage UST is moved to the pinned turbo write buffer TWB-p depending on a value set in the field. In an embodiment, an example is illustrated in FIG. 13 as data stored at the physical address "X" of the user storage UST is moved to a physical address Z of the pinned turbo write buffer TWB-p. Existing data stored in the user storage UST may be erased physically or logically. However, existing data stored in the user storage UST may not be erased physically depending on a policy set by the memory area property manager MAPM-d.

In operation S93, the storage device 1200 transfers the RESPONSE UPIU including information MOVE indicating that the move of data has completed, to the host 1100.

In operation S101, the host 1100 transfers, to the storage device 1200, a command UPIU including the move command MV CMD and a logical address of an area in which data to be moved is stored. The command UPIU may include a field at which information about a destination (i.e., TWB-np) to which data is to be moved is recorded, and data stored at the physical address Y1 of the pinned turbo write buffer TWB-p may be moved to a physical address Y2 of the non-pinned turbo write buffer TWB-np depending on a value set in the field (S102).

In operation S103, the storage device 1200 transfers the RESPONSE UPIU including information MOVE indicating that the move of data has completed, to the host 1100.

Figure 14A:
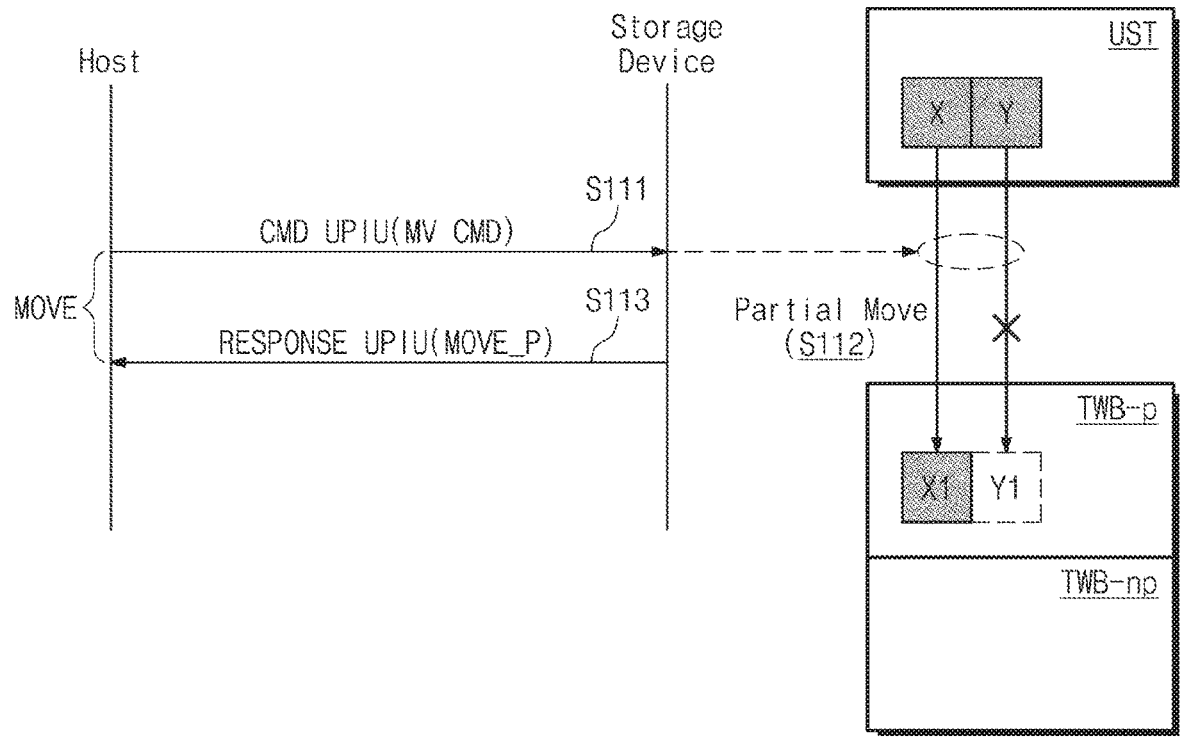
FIGS. 14A to 14C illustrate policies for managing a turbo write buffer, which may be set by a memory area property manager.
Figure 14B:
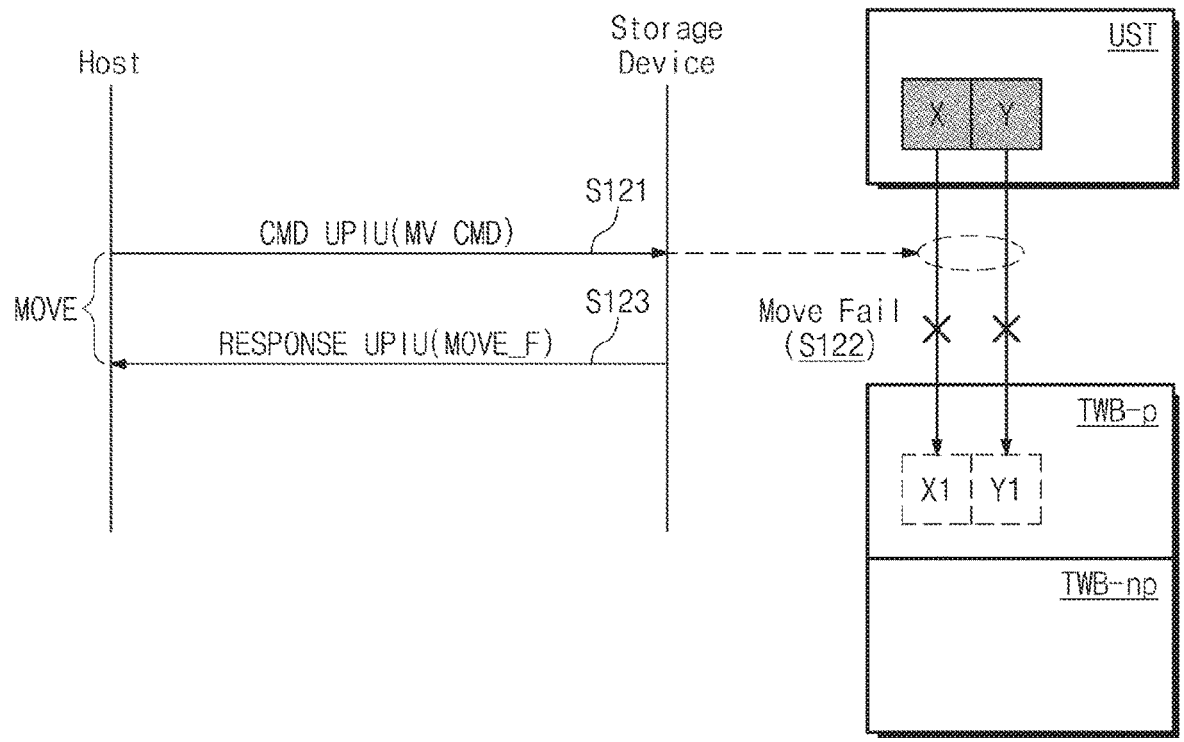
Figure 14C:
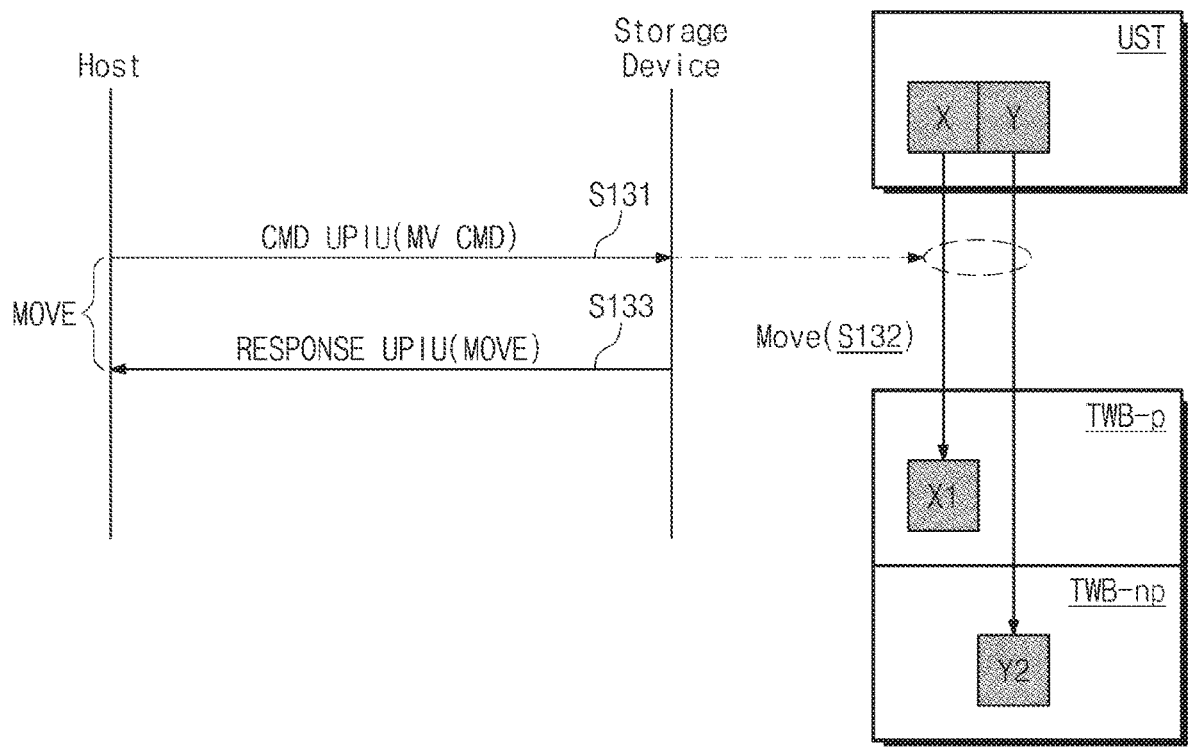

FIGS. 14A to 14C illustrate exemplary policies for managing the turbo write buffers TWB-p and TWB-np, which may be set by the memory area property manager MAPM-d.

Referring to FIG. 14A, the storage device 1200 receives a command UPIU including the move command MV CMD from the host 1100 (S111). Some situations may occur depending on a size of move-requested data and a free capacity of the pinned turbo write buffer TWB-p.

When a size of data corresponding to the received logical address is larger than a size of the pinned turbo write buffer TWB-p, the storage device 1200 may move only a portion of the data to the pinned turbo write buffer TWB-p (S112). For example, the storage device 1200 may move partial data, which corresponds to the physical address "X", of the data stored in the user storage UST to the physical address X1 of the pinned turbo write buffer TWB-p. In contrast, the storage device 1200 may fail to move partial data, which corresponds to the physical address "Y", of the data stored in the user storage UST to the pinned turbo write buffer TWB-p, and thus, a failure may occur.

Afterwards, the storage device 1200 may transfer the RESPONSE UPIU including information MOVE_P indicating that a partial move of data has been performed, to the host 1100 (S113).

Referring to FIG. 14B, the storage device 1200 receives a command UPIU including the move command MV CMD from the host 1100 (S121). When a size of data corresponding to the received logical address is larger than a size of the pinned turbo write buffer TWB-p, the storage device 1200 may process a move of data to the pinned turbo write buffer TWB-p as a failure (S121). Afterwards, the storage device 1200 may transfer the RESPONSE UPIU including information MOVE_F indicating that a move of data failed, to the host 1100 (S123).

Referring to FIG. 14C, the storage device 1200 receives a command UPIU including the move command MV CMD from the host 1100 (S131).

When a size of data corresponding to the received logical address is larger than a size of the pinned turbo write buffer TWB-p, the storage device 1200 may move data to different areas of the turbo write buffer TWB. For example, the storage device 1200 may move data stored at the physical address "X" of the user storage UST to the physical address X1 of the pinned turbo write buffer TWB-p and may move data stored at the physical address "Y" of the user storage UST to the physical address Y2 of the non-pinned turbo write buffer TWB-np. Of course, a move of data according to this policy may be allowed under the condition that a free space of the non-pinned turbo write buffer TWB-np is secured as much as a size of the data stored at the physical address "Y" of the user storage UST. For example, if the size of the combined data stored at physical address "X" and physical address "Y" is too large to fit entirely within the pinned turbo write buffer TWB-p and there is sufficient remaining space in the non-pinned turbo write buffer TWB-np, then some of the data can be stored in the pinned turbo write buffer TWB-p and the rest of the data can be stored in the pinned turbo write buffer TWB-p.

Afterwards, the storage device 1200 transfers the RESPONSE UPIU including information MOVE indicating that a move of data has been performed, to the host 1100

(S133). In addition, the RESPONSE UPIU may further include information indicating that data has been moved to the pinned turbo write buffer TWB-p and the non-pinned turbo write buffer TWB-np.

Figure 15:
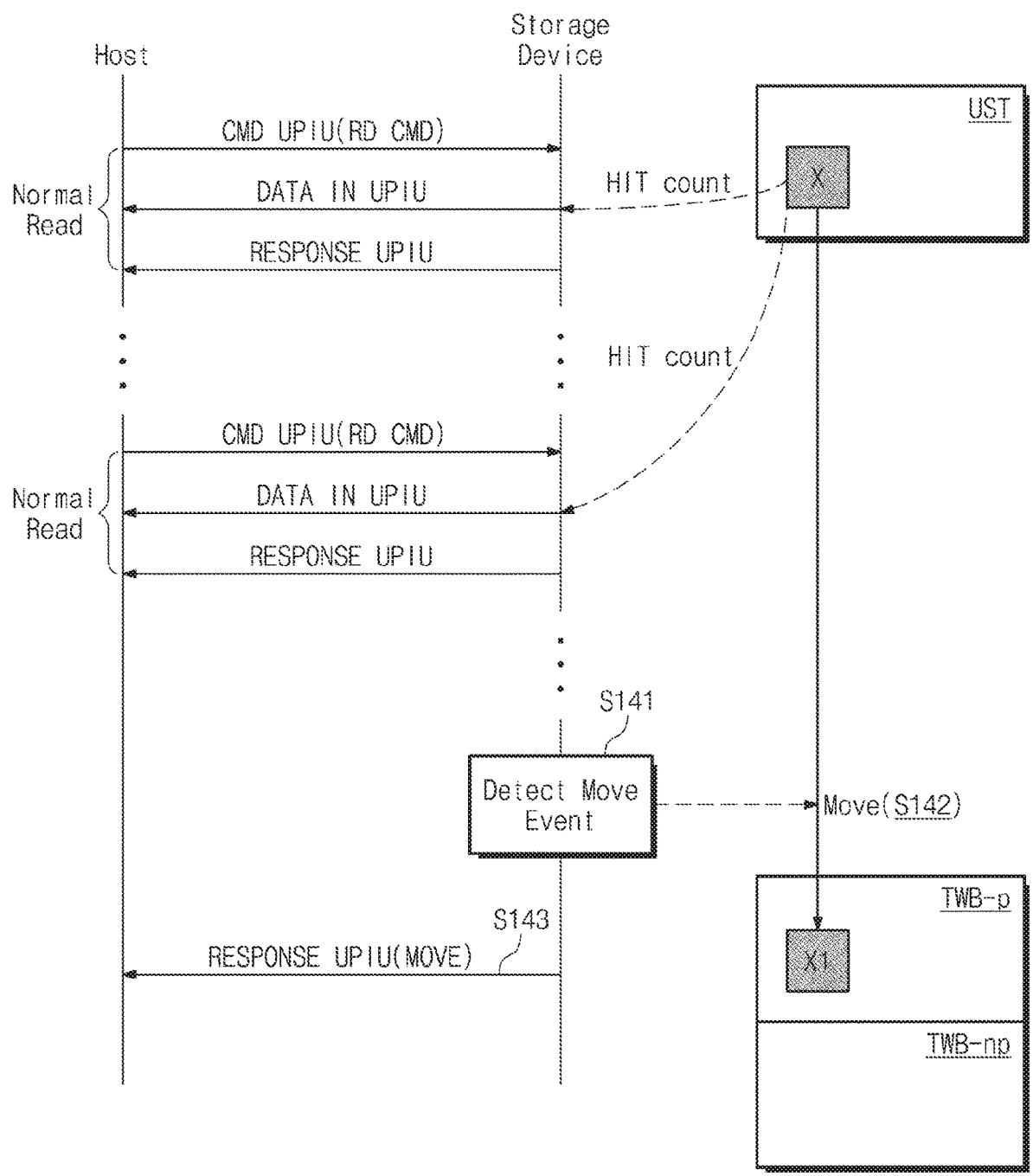
FIG. 15 illustrates a policy for managing a turbo write buffer, which may be set by a memory area property manager.

FIG. 15 illustrates an exemplary policy for managing the turbo write buffers TWB-p and TWB-np, which may be set by the memory area property manager MAPM-d. The embodiment described with reference to FIG. 14 may relate to a policy associated with a move of data that is performed depending on an explicit request of the host 1100, and the embodiment of FIG. 15 may relate to a policy of the storage device 1200 determined by the storage device 1200 itself without intervention of the host 1100 or feedback.

Before a move of data is actually performed, the storage device 1200 may count the number of hits according to a read request received from the host 1100, depending on a policy set by the memory area property manager MAPM-d. Here, the number of hits may mean the number of DATA IN UPIUs that are based on data read from the user storage UST and are normally transferred to the host 1100. A counting result may be stored in the user storage UST, the turbo write buffer (TWB-p, TWB-np), or another storage device (not illustrated). For example, the another storage device could be located in the memory controller 1210 or within the storage device 1200, but outside the nonvolatile memory device 1220 and outside the memory controller 1210.

The storage device 1200 determines whether a move event occurs, based on the number of hits counted during a reference period or a given time (S141). For example, when the number of hits counted during the reference period exceeds a reference value, the storage device 1200 may determine that due to the occurrence of an event it is necessary to move read-requested data to the pinned turbo write buffer TWB-p. Depending on a result of the determination, the storage device 1200 moves the data stored in the user storage UST to the pinned turbo write buffer TWB-p (S142).

In an exemplary embodiment, when a size of data read-requested from the host 1100 is larger than a size of the pinned turbo write buffer TWB-p, the storage device 1200 may move the read-requested data stored in the user storage UST to the non-pinned turbo write buffer TWB-np.

Alternatively, when a size of data read-requested from the host 1100 is larger than a size of the pinned turbo write buffer TWB-p, the storage device 1200 may move the read-requested data stored in the user storage UST to the pinned turbo write buffer TWB-p and the non-pinned turbo write buffer TWB-np. In this case, with respect to the data determined as being targeted for a move to the turbo write buffers TWB-p and TWB-np, a portion in which the number of hits is relatively small may be moved to the non-pinned turbo write buffer TWB-np, and a portion in which the number of hits is relatively great may be moved to the pinned turbo write buffer TWB-p.

Afterwards, the storage device 1200 transfers, to the host 1100, the RESPONSE UPIU including information MOVE indicating that a move of data to the turbo write buffers TWB-p and/or TWB-np has been made due to the occurrence of a move event in the storage device 1200 (S143).

Figure 16:
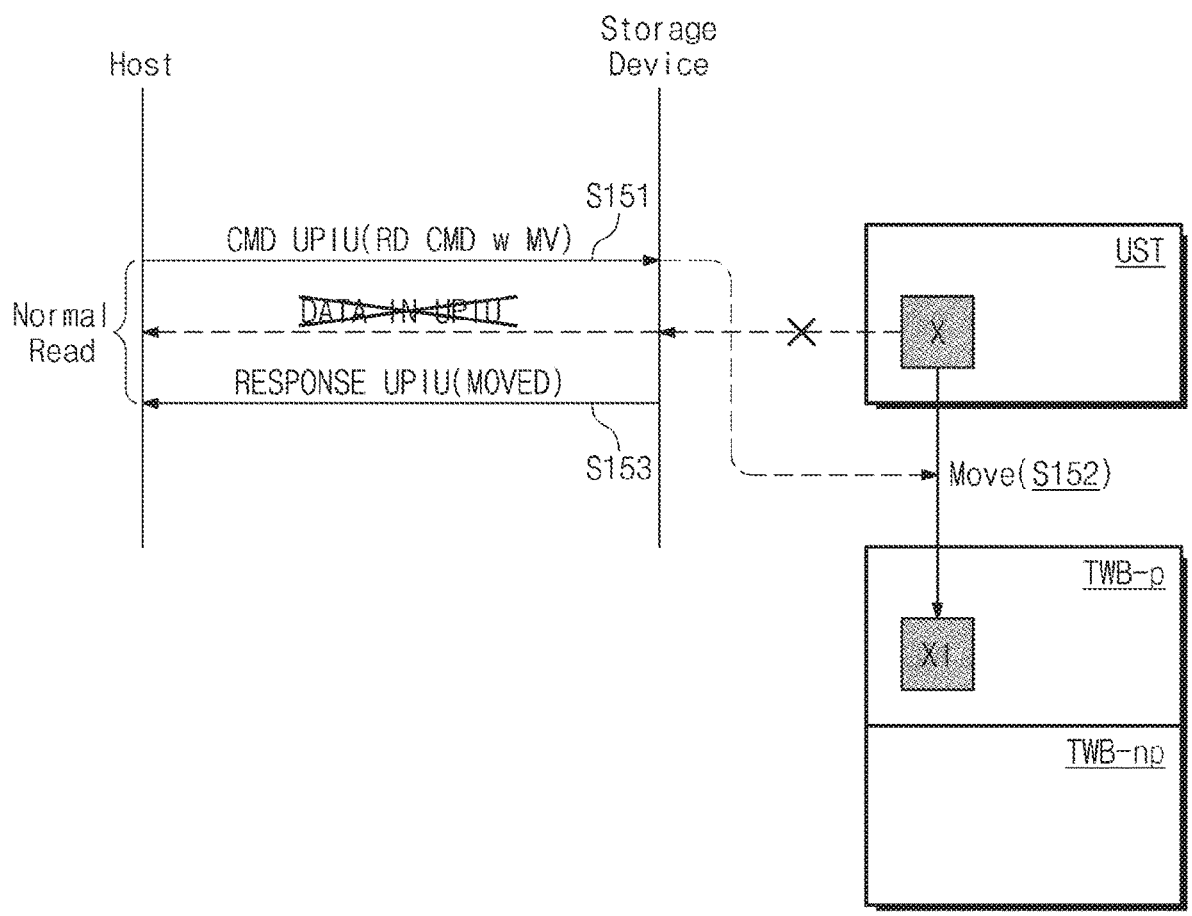
FIG. 16 is a flowchart illustrating operations of a storage system of FIG. 1 according to an exemplary embodiment of the inventive concept.

FIG. 16 is a flowchart illustrating operations of a storage system of FIG. 1 according to an exemplary embodiment of the inventive concept. Unlike the embodiments described with reference to FIGS. 12 and 13, the embodiment of FIG. 16 relates to a read operation that does not accompany a move of data to the host 1100. A move operation of the storage system 1000 will be described with reference to FIGS. 1, 2, and 16.

In general, write data is stored in the user storage UST by a request of the host 1100. Afterwards, when it is necessary to manage data in the turbo write buffer TWB-p or TWB-np, the host 1100 may transfer a command UPIU including the read command RD CMD to the storage device 1200 (S151). The command UPIU may include the move factor MV described with reference to FIG. 12. The move factor MV may include information indicating that a move of data is required, or information indicating a destination (e.g., the pinned turbo write buffer TWB-p or the non-pinned turbo write buffer TWB-np) to which data is to be moved.

In an embodiment, the command UPIU may include a field (e.g., "Expected Data Transfer Length") associated with a size of data to be transferred from the storage device 1200 to the host 1100. When a value of the expected data transfer length is not "0", the read data may be transferred from the storage device 1200 to the host 1100. When the value of the expected data transfer length is "0", the read data is not transferred to the host 1100.

Because the value of the expected data transfer length of the command UPIU is "0" and a destination to which data is to be moved is set through the move factor MV, data stored in the user storage UST is not transferred to the host 1100. Instead, data stored at the physical address "X" corresponding to a logical address received together with the command UPIU is moved to the physical address X1 of the pinned turbo write buffer TWB-p (S152). However, the inventive concept is not limited thereto. For example, data stored in the user storage UST may be moved to the non-pinned turbo write buffer TWB-np depending on a value of the move factor MV.

The policies described with reference to FIGS. 14A to 14C may be applied to the embodiment of FIG. 16. The embodiment of FIG. 16 is similar to the embodiment of FIG. 13 except for a kind of a command received from the host 1100, and thus, with regard to the application of the policies of FIGS. 14A to 14C, additional description will be omitted to avoid redundancy.

Afterwards, the storage device 1200 transfers, to the host 1100, the RESPONSE UPIU including information indicating that the data of the user storage UST has been moved to the pinned turbo write buffer TWB-p (S153).

Figure 17:
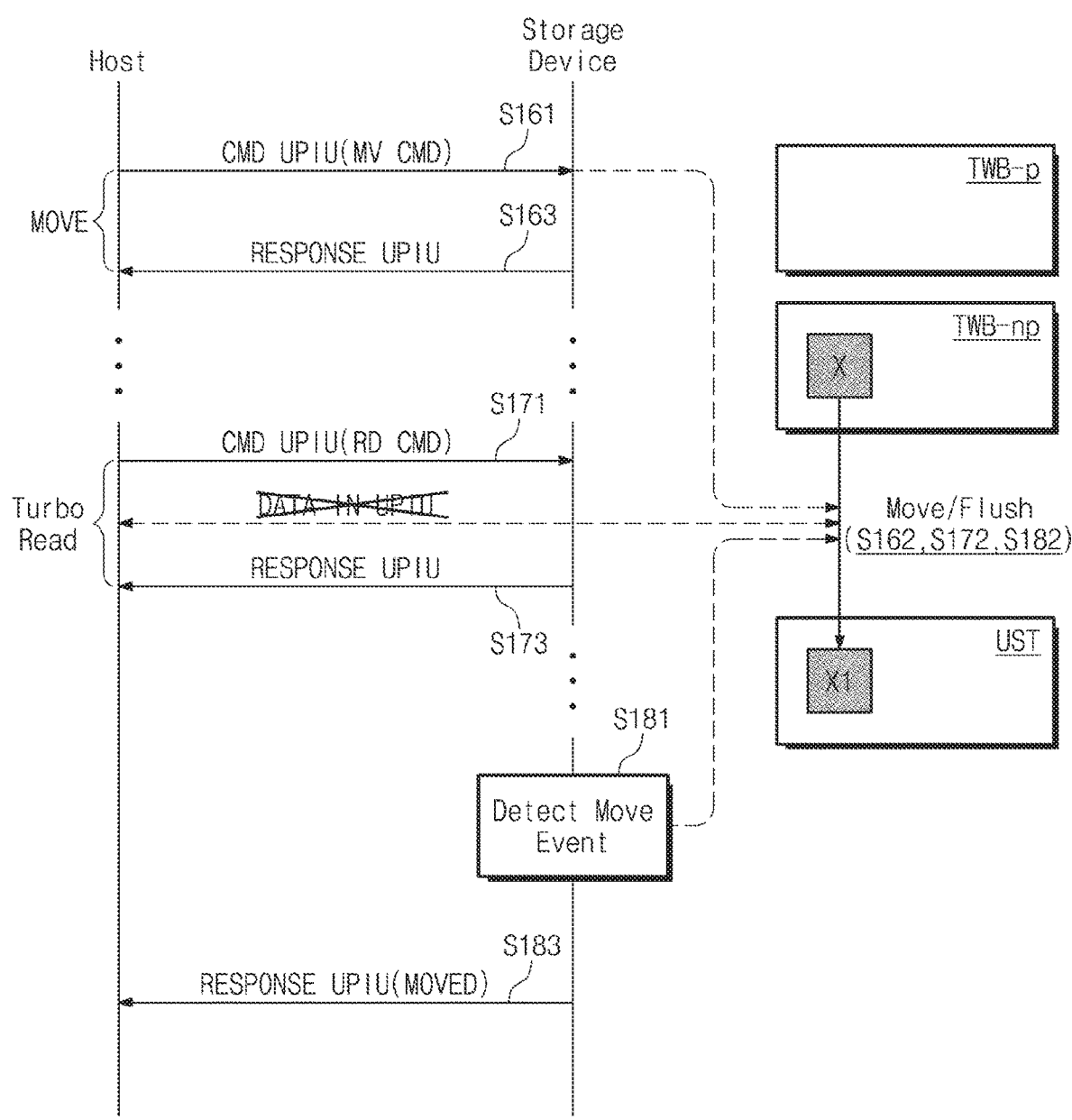
FIG. 17 is a flowchart illustrating operations of a storage system of FIG. 1 according to an exemplary embodiment of the inventive concept.

FIG. 17 is a flowchart illustrating operations of a storage system of FIG. 1 according to an exemplary embodiment of the inventive concept. Unlike the embodiments described with reference to FIGS. 12, 13, and 16, the embodiment of FIG. 17 relates to a move of data from the non-pinned turbo write buffer TWB-np to the user storage UST. A move operation of the storage system 1000 will be described with reference to FIGS. 1, 2, and 17.

The embodiment of operation S161 to operation S163 is associated with a move of data to the user storage UST through the move command MV CMD.

In operation S161, the host 1100 transfers a command UPIU including the move command MV CMD to the storage device 1200. The command UPIU may include a field at which information about a destination (i.e., UST) to which data is to be moved is recorded, and data stored at the physical address "X" of the non-pinned turbo write buffer TWB-np may be moved to the physical address X1 of the user storage UST depending on a value set in the field (S162).

In operation S163, the storage device 1200 transfers the RESPONSE UPIU including information MOVE indicating that the move of data has completed, to the host 1100.

The embodiment of operation S171 to operation S173 is associated with a move of data to the user storage UST through a turbo read command.

In operation S171, the host 1100 transfers a command UPIU including the read command RD CMD, a logical address of data to be moved, and the move factor MV to the storage device 1200. The move factor MV may include information indicating that a move of data to the user storage UST is required and information indicating a destination (i.e., the user storage UST) to which data is to be moved.

As in the above embodiment described with reference to FIG. 16, the command UPIU may include a field (e.g., "Expected Data Transfer Length") associated with a size of data to be transferred from the storage device 1200 to the host 1100, and a value thereof may be "0". Accordingly, data stored at the physical address "X" of the non-pinned turbo write buffer TWB-np is not transferred to the host 1100 and may be moved to the physical address X1 of the user storage UST.

In operation S173, the storage device 1200 transfers, to the host 1100, the RESPONSE UPIU including information indicating that the data of the non-pinned turbo write buffer TWB-np has moved to the user storage UST.

The embodiment of operation S181 to operation S183 is associated with a move of data to the user storage UST through a policy of the storage device 1200 without intervention of the host 1100. In particular, without intervention of the host 1100, a move of data to the user storage UST through a policy of the storage device 1200 itself may be referred to as a "flush".

In operation S181, the storage device 1200 may detect whether an event of moving data of the non-pinned turbo write buffer TWB-np to the user storage UST has occurred.

In an embodiment, when the capacity of the non-pinned turbo write buffer TWB-np is insufficient, the storage device 1200 may detect an event has occurred indicating that it is necessary to move data of the non-pinned turbo write buffer TWB-np to the user storage UST. For example, in the case where data to be newly stored in the non-pinned turbo write buffer TWB-np exists but a capacity of the non-pinned turbo write buffer TWB-np is insufficient, the storage device 1200 may determine a move to the user storage UST is needed depending on a priority of data. The priority of data may be determined by a policy of the memory area property manager MAPM-d.

The storage device 1200 may move data of a relatively low priority from the non-pinned turbo write buffer TWB-np to the user storage UST, and existing data stored in the non-pinned turbo write buffer TWB-np may be physically erased. For example, the moved data may be erased from the non-pinned turbo write buffer TWB-np. Alternatively, the storage device 1200 may maintain data of a relatively low priority in the non-pinned turbo write buffer TWB-np. Instead, the storage device 1200 may move data of a relatively high priority to the pinned turbo write buffer TWB-p for the purpose of solving an insufficient capacity of the non-pinned turbo write buffer TWB-np. For example, the storage device 1200 may move data of a relatively high priority from the non-pinned turbo write buffer TWB-np to the pinned turbo write buffer TWB-p.

In another embodiment, when the number of hits of data stored in the non-pinned turbo write buffer TWB-np is smaller than a reference value, the storage device 1200 may determine whether an event has occurring indicating that it is necessary to move data to the user storage UST.

When the number of hits counted during the reference period or the given time is smaller than the reference value, the storage device 1200 may regard the corresponding data as data that is not frequently accessed, and may determine that the event has occurred indicating that it is necessary to move data to the user storage UST. Depending on a result of the determination, the storage device 1200 may flush the corresponding data to the user storage UST, and existing data stored in the non-pinned turbo write buffer TWB-np may be physically erased.

Figure 18:
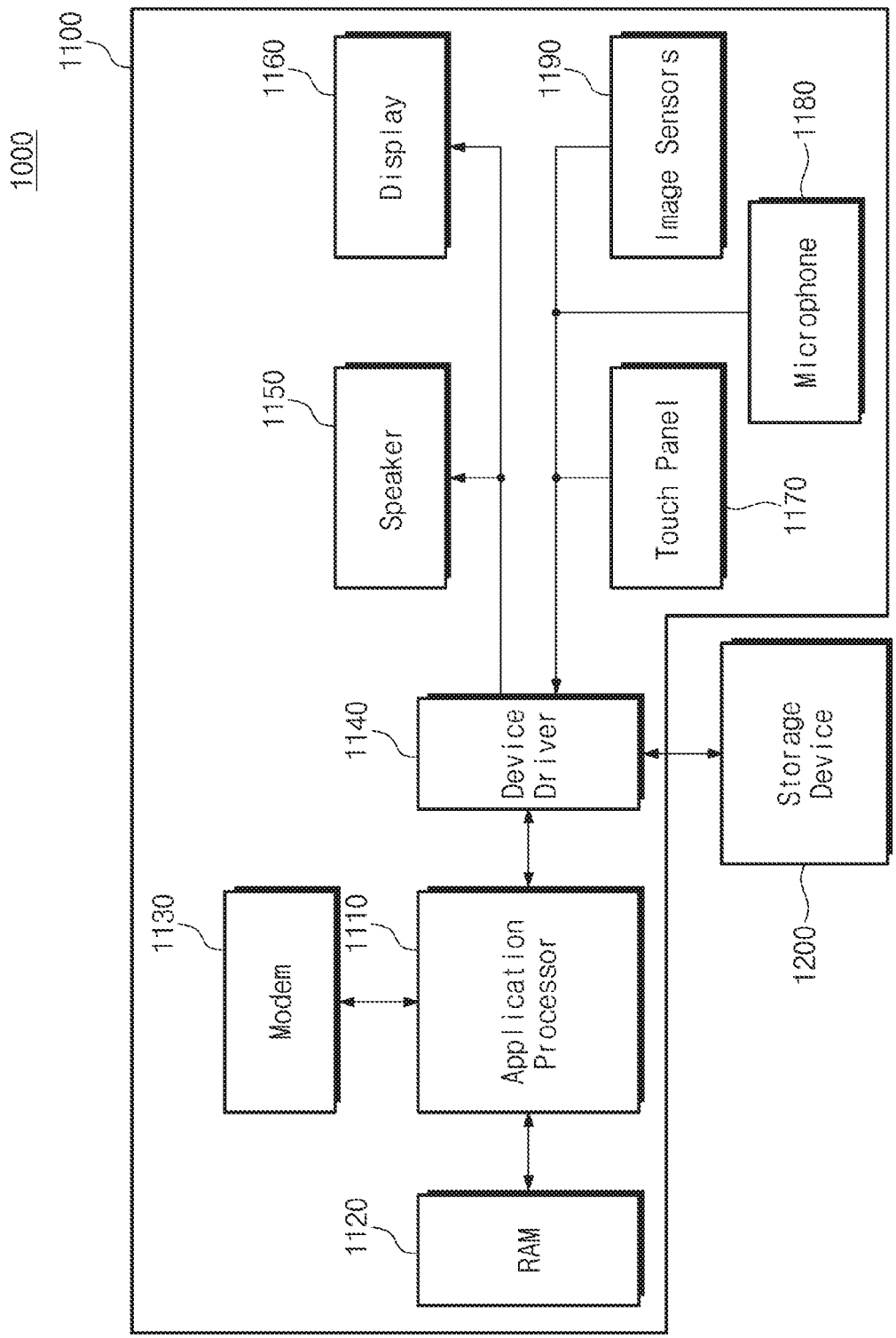
FIG. 18 illustrates an exemplary configuration of an electronic device according to an exemplary embodiment of the inventive concept.

FIG. 18 is a block diagram illustrating the storage system 1000 according to an exemplary embodiment of the inventive concept in detail. Referring to FIGS. 2 and 18, the storage system 1000 may include the host 1100 and the storage device 1200. The host 1100 and the storage device 1200 may operate as described with reference to FIGS. 1 to 17.

The host 1100 may include an application processor 1110, a random access memory (RAM) 1120, a modem 1130, a device driver 1140, a speaker 1150, a display 1160, a touch panel 1170, a microphone 1180, and image sensors 1190.

The application processor 1110 may execute the application AP-h and the file system FS-h. The application processor 1110 may use the RAM 1120 as a system memory. The application processor 1110 may communicate with an external device through the modem 1130 in a wired fashion or wirelessly. For example, the modem 1130 may be embedded in the application processor 1110. The application processor 1110 may communicate with peripheral devices through the device driver 1140. For example, the application processor 1110 may communicate with the speaker 1150, the display 1160, the touch panel 1170, the microphone 1180, the image sensors 1190, and the storage device 1200 through the device driver 1140.

The device driver 1140 may include the device manager DM-h, the UFS application layer UAP-h, the UFS transport protocol layer UTP-h, and the UFS interconnect layer UIC-h. For example, the device driver 1140 may be embedded in the application processor 1110.

The speaker 1150 and the display 1160 may be user output interfaces that transfer information to a user. The touch panel 1170, the microphone 1180, and the image sensors 1190 may be user input interfaces that receive information from the user.

In an exemplary embodiment of the inventive concept, the storage device 1200 may be used as a high-capacity storage medium of the host 1100. The storage device 1200 may be an embedded type of UFS device or a memory card type of UFS device. The UFS device of the memory card type may be inserted into or detached from an UFS slot included in the host 1100.

Figure 19:
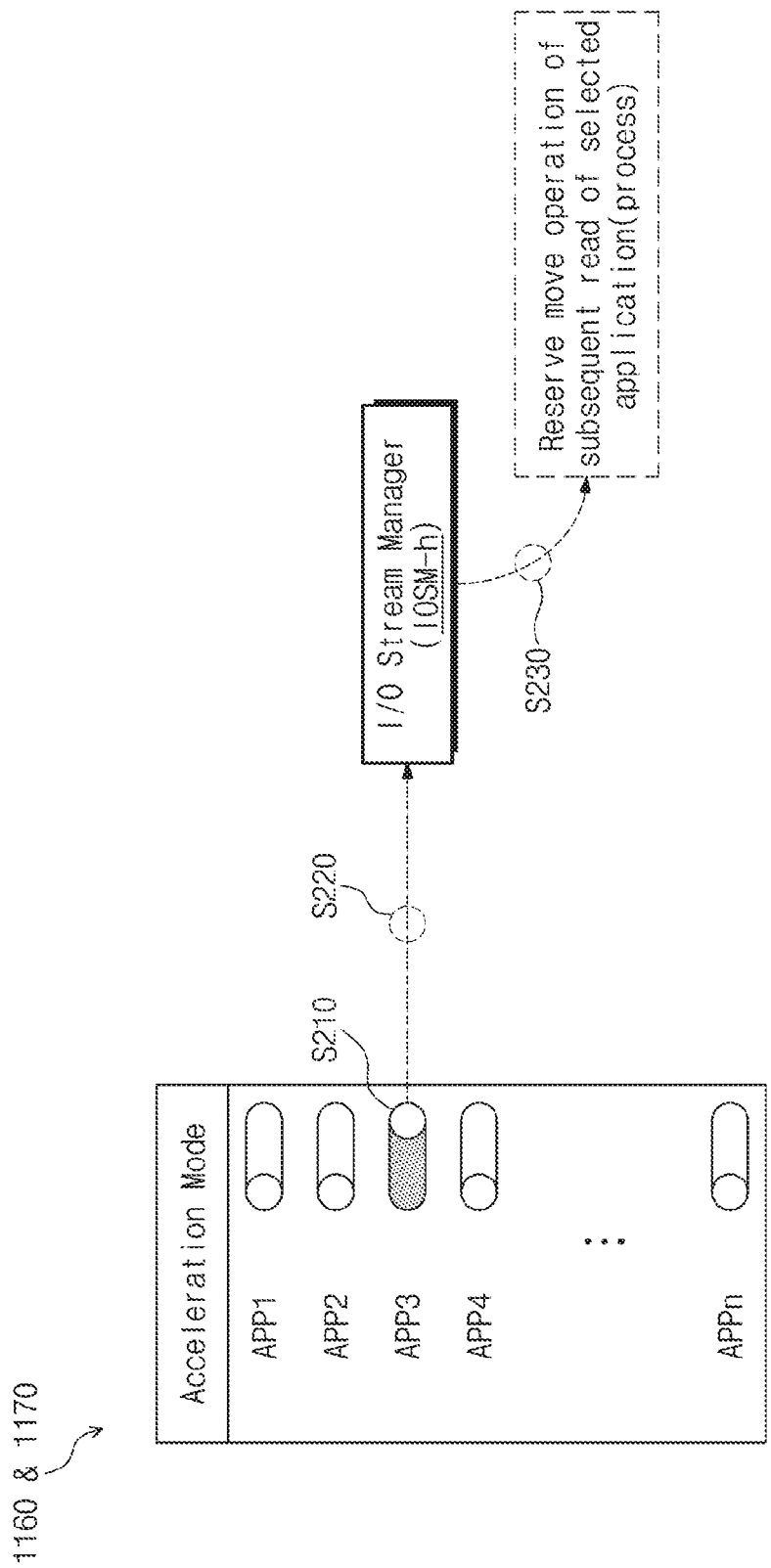
FIG. 19 illustrates a conceptual diagram in which an embodiment of the inventive concept is applied to a storage system.

FIG. 19 illustrates a diagram in which an exemplary embodiment of the inventive concept is applied to the storage system 1000. Referring to FIGS. 18 and 19, the storage system 1000 may provide setting screens through the display 1160. One of the setting screens may provide information of an acceleration mode to the user.

The storage system 1000 may display a list of first to n-th applications APP1 to APPn, to which the acceleration modes are applicable, through the display 1160. In addition, the storage system 1000 may display, through the display 1160, switches that allow the user to adjust the acceleration modes of the first to n-th applications APP1 to APPn.

In operation S210, the user may touch an enable location of the acceleration mode of the third application APP3. The storage system 1000 may sense a touch of the user, in other words, the directions activating the third application APP3 through the touch panel 1170. In operation S1200, information of the third application APP3 or processes of the third application APP3 may be transferred to the I/O stream manager IOSM-h.

As the information of the third application APP3 or the processes of the third application APP3 are received, in operation S230, the I/O stream manager IOSM-h may reserve a move operation of a subsequent read of the third application APP3 or the processes thus selected. For example, the I/O stream manager IOSM-h may set the move attributes MA with respect to data associated with the third application APP3 through the query request UPIU and may include a move flag as the move information MV in the CMD UPIU when a read operation associated with the third application APP3 is required.

As another example, the I/O stream manager IOSM-h may include a move flag and the move attributes MA as the move information MV in the CMD UPIU when a read operation associated with the third application APP3 is required. For example, the I/O stream manager IOSM-h may specify the pinned turbo write buffer TWB-p or the non-pinned turbo write buffer TWB-np as the destination information DST of the move attributes MA.

When the data associated with the third application APP3 are moved to the pinned turbo write buffer TWB-p or the non-pinned turbo write buffer TWB-np, an operation of reading the data associated with the third application APP3 is accelerated. Accordingly, the performance of the third application APP3 may be accelerated.

Figure 20:
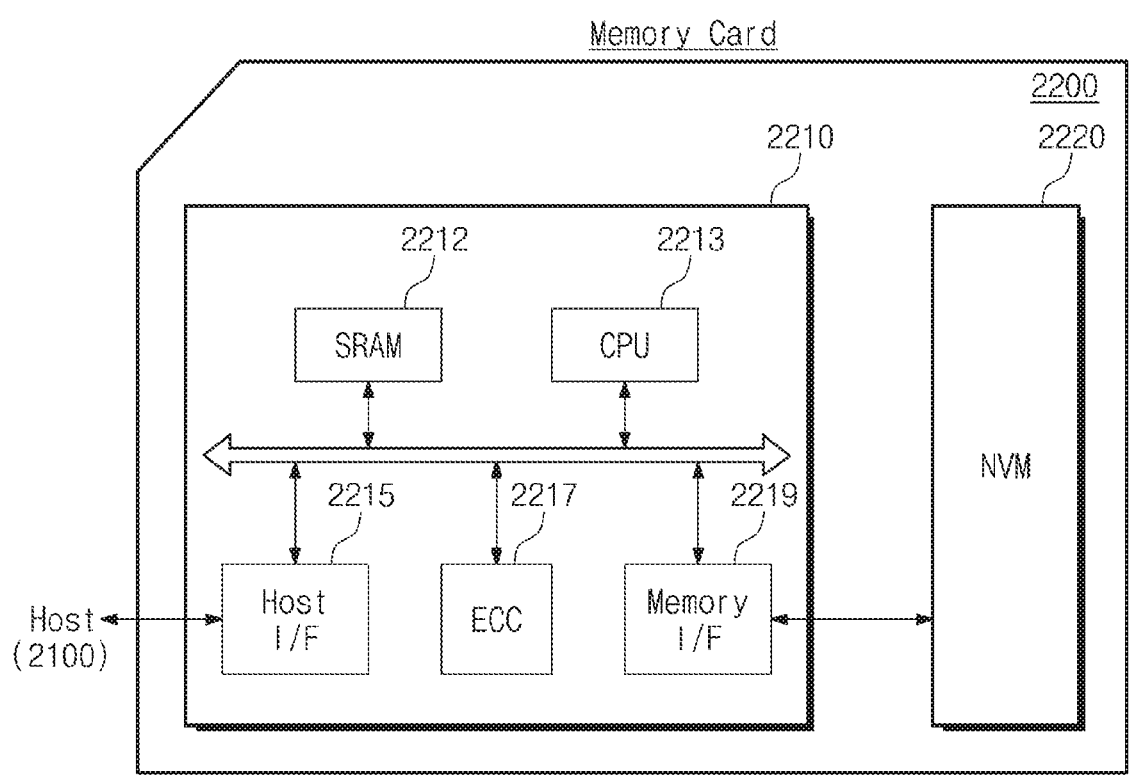
FIG. 20 illustrates an exemplary configuration of a memory card to which a storage system according to an embodiment of the inventive concept is applied.

FIG. 20 illustrates an exemplary configuration of a memory card to which a storage system according to an embodiment of the inventive concept may be applied. Referring to FIG. 20, a memory card 2200 connected with a host 2100 includes a memory controller 2210 and a nonvolatile memory 2220. The memory controller 2210 is connected with the nonvolatile memory 2220. The memory controller 2210 is configured to access the nonvolatile memory 2220. For example, the memory controller 2210 is configured to control a read operation, a write operation, an erase operation, and a background operation of the nonvolatile memory 2220. The background operation includes operations such as a wear-leveling operation and a garbage collection operation.

The memory controller 2210 includes an SRAM 2212, a CPU 2213, a host interface 2215, an error correction engine 2217, and a memory interface 2219. The memory controller 2210 may perform the UFS-based turbo write, turbo read, and data move described with reference to FIGS. 1 to 17. The nonvolatile memory 2220 may be implemented with a nonvolatile memory device such as a NAND flash memory or a NOR flash memory. For example, the memory controller 2210 and the nonvolatile memory 2220 may be integrated into one semiconductor device to constitute a UFS card. The memory controller 2210 may be implemented by the memory controller 1210 and the nonvolatile memory 2220 may be implemented by the nonvolatile memory 1220.

According to at least one embodiment of the inventive concept, a nonvolatile storage device may include an area (e.g., a turbo write buffer) different from a user storage area, in a nonvolatile memory device. The included area may be programmed using a scheme different from a program scheme of the user storage, and thus, write and read speeds of the storage device may be improved. In addition, unlike a buffer implemented with a volatile memory, because the area is included within the nonvolatile memory device, reliability of data stored therein may be improved.

While the inventive concept has been described with reference to exemplary embodiments thereof, it will be apparent to those of ordinary skill in the art that various changes and modifications may be made thereto without departing from the spirit and scope of the inventive concept.

What is claimed is:

1. A storage device comprising:
a nonvolatile memory device comprising a first region including memory cells configured to store n-bit data, a second region including memory cells configured to store m-bit data and a register storing a flag, the first region including a first area and a second area, and the second region including a third area; and
a memory controller configured to perform one of a turbo write operation on the first area or the second area and a normal write operation on the third area, and configured to perform one of a turbo read operation on the first area or the second area and a normal read operation on the third area, wherein n and m are natural numbers and n is less than m,
wherein the memory controller performs one of a first flush operation and a second other flush operation to move data stored in the first region to the second region,
wherein the memory controller performs the first flush operation when a first field of the flag is set by the host and performs the second flush operation when a second other field of the flag is set by the host.

2. The storage device of claim 1, wherein the write command includes destination information indicating one of the first area and the second area, and wherein the memory controller writes the data to a selected one of the first area and the second area based on the destination information.

3. The storage device of claim 1, wherein the memory controller performs the normal write operation to write data to the third area in response to a write command from the host when a turbo write function is disabled by the host.

4. The storage device of claim 3, wherein the memory controller moves the data written to the third area to the first area or the second area in response to a move command or a read command from the host.

5. The storage device of claim 4, wherein, when a size of the data is greater than an available capacity of the first area, the memory controller processes the move of the data to the first area as a failure.

6. The storage device of claim 4, wherein, when a size of the data is greater than an available capacity of the first area, the memory controller moves a portion of the data to the first area and moves the remaining portion of the data to the second area.

7. The storage device of claim 4, wherein, when the data is moved to the first area or the second area by the read command, a value of an expected data transfer length of the read command causing the move of the data is "0".

8. The storage device of claim 3, wherein the memory controller counts a number of hits according to a read request of the host with regard to the data written to the third area and moves the data to the first area or the second area based on the counting result.

9. The storage device of claim 1, wherein the memory controller moves the data stored in the first area or the second area to the third area in response to a command from the host.

10. The storage device of claim 1,
wherein the memory controller performs the first flush operation when the first field is set and the storage device is in a low-power mode, and
wherein the memory controller performs the second flush operation when the second field is set, the storage device is not in the low-power mode, and a command queue of the storage device is empty.

11. A storage device comprising:
a nonvolatile memory device comprising a first region used as a single-level cell (SLC) space and a second region used as a multi-level cell (MLC) space or a triple-level cell (TLC) space; and
a memory controller configured to write data received from a host to one of the first region and the second region, in response to a write command from the host, wherein the memory controller preferentially writes the data to the first region upon receiving a request from the host to enable a turbo write operation,
wherein the write command includes destination information indicating one of a first area and a second area of the first region, and
wherein the memory controller writes the data to one of the first area and the second area based on a setting value of the destination information,
wherein the memory controller counts a number of hits in data in universal flash storage (UFS) protocol information units (DATA IN UPIUs) with regard to the data written to the second region according to a read request of the host and moves data of the second region to the first area or the second area when the counted number exceeds a reference value during a reference period,
wherein the DATA IN UPUI are based on data read from the second region and transferred to the host before the memory controller counts the number of the DATA IN UPIU.

12. The storage device of claim 11, wherein the memory controller writes the data to the second region when the setting value of the destination information does not exist.

13. The storage device of claim 12, wherein, when the data is stored to the second region, the memory controller moves the data to the first area or the second area in response to a request from the host or an occurrence of a move event for the data.

14. The storage device of claim 13, wherein, when a size of the data is greater than an available capacity of the first area, the memory controller moves at least a portion of the data to the first area or processes the move of the data to the first area as a failure.

15. A storage device comprising:
a nonvolatile memory device including a turbo write buffer, user storage and a register storing a flag, wherein the turbo write buffer includes a plurality of memory cells each storing a first bit, and the user storage includes a plurality of memory cells each storing a second bit greater than the first bit; and
a memory controller configured to write data to a selected one of a pinned turbo write buffer of the turbo write buffer and a non-pinned turbo write buffer of the turbo write buffer in response to a write command universal flash storage protocol information unit (UPIU) received from a host,
wherein a priority of data stored in the pinned turbo write buffer is higher than a priority of data stored in the non-pinned turbo write buffer, the memory controller migrating data of the turbo write buffer to the user storage according to the priority,
wherein the migrating migrates first data of the turbo write buffer to the user storage when a first field of the flag is set by the host and migrates second data of the turbo write buffer to the user storage when a second field of the flag is set by the host.

16. The storage device of claim 15, wherein the memory controller writes the data to the selected turbo write buffer based on destination information of the write command UPIU.

17. The storage device of claim 15, wherein, when the data is written to the non-pinned turbo write buffer, the memory controller moves the data written to the non-pinned turbo write buffer to the user storage in response to a request from the host or an occurrence of a move event for the data.

18. The storage device of claim 15, wherein the memory controller writes the data in the user storage in response to the write command UPIU from which destination information is absent.

19. The storage device of claim 18, wherein the memory controller migrates the data written to the user storage to the pinned turbo write buffer or the non-pinned turbo write buffer in response to a move command UPIU or a read command UPIU from the host.

20. The storage device of claim 15,
wherein the migrating migrates the first data when both the first field is set and the storage device is in a low-power mode, and
wherein the migrating migrates the second data when the second field is set, the storage device is not in the low-power mode, and a command queue of the storage device is empty.

* * * * *